United States Patent
Feng et al.

(10) Patent No.: US 10,033,313 B2
(45) Date of Patent: Jul. 24, 2018

(54) CONTROL METHOD FOR RESTARTING PERMANENT MAGNET SYNCHRONOUS MOTOR WITH SPEED, DEVICE AND SYSTEM THEREOF

(71) Applicant: CSR ZHUZHOU ELECTRIC LOCOMOTIVE RESEARCH INSTITUTE CO., LTD., Zhuzhou, Hunan (CN)

(72) Inventors: Jianghua Feng, Hunan (CN); Kean Liu, Hunan (CN); Junfeng Xu, Hunan (CN); Jing Shang, Hunan (CN); Yuliang Wen, Hunan (CN); Yaping He, Hunan (CN); Chaoyang Zhang, Hunan (CN); Xiong Liu, Hunan (CN); Yonghui Nan, Hunan (CN); Huadong Liu, Hunan (CN); Lei Xiao, Hunan (CN); Hanfeng Zheng, Hunan (CN)

(73) Assignee: CSR ZHUZHOU ELECTRIC LOCOMOTIVE RESEARCH INSTITUTE CO., LTD., Zhuzhou, Hunan (CN)

( * ) Notice: Subject to any disclaimer, the term of this patent is extended or adjusted under 35 U.S.C. 154(b) by 145 days.

(21) Appl. No.: 15/031,479

(22) PCT Filed: Dec. 16, 2013

(86) PCT No.: PCT/CN2013/089575
§ 371 (c)(1),
(2) Date: Apr. 22, 2016

(87) PCT Pub. No.: WO2015/058445
PCT Pub. Date: Apr. 30, 2015

(65) Prior Publication Data
US 2016/0285397 A1 Sep. 29, 2016

(30) Foreign Application Priority Data
Oct. 25, 2013 (CN) .......................... 2013 1 0512095

(51) Int. Cl.
*H02P 6/20* (2016.01)
*H02P 6/182* (2016.01)
(Continued)

(52) U.S. Cl.
CPC ................ *H02P 6/20* (2013.01); *H02P 1/029* (2013.01); *H02P 6/182* (2013.01); *H02P 6/24* (2013.01);
(Continued)

(58) Field of Classification Search
CPC ............. H02P 6/20; H02P 21/18; H02P 21/22
(Continued)

(56) References Cited

U.S. PATENT DOCUMENTS

2009/0140676 A1* 6/2009 Son .......................... H02P 21/13
318/400.04
2009/0184678 A1* 7/2009 Son .......................... H02P 6/185
318/801

(Continued)

FOREIGN PATENT DOCUMENTS

CN 101791984 A 8/2010
CN 103312241 A 9/2013

OTHER PUBLICATIONS

Ewald Robeischl et al.,"Optimized Inform Measurement Sequence for Sensorless PM Synchronous Motor Drives With Respect to Minimum Current Distortion", IEEE Transactions on Industry Applications, vol. 40, No. 2, Mar./Apr. 2004; pp. 591-598.
(Continued)

*Primary Examiner* — Kawing Chan
(74) *Attorney, Agent, or Firm* — Cantor Colburn LLP

(57) ABSTRACT

A control method for restarting a permanent magnet synchronous motor (PMSM) in a rotating condition, and a
(Continued)

device and a system thereof are provided. In the method, an electrical angular speed $\omega_e$ of the PMSM is obtained based on a speed of a trailer to obtain a back electromotive force of the PMSM. The back electromotive force is compared with a voltage at a side of an inverter, and if the electromotive force of the permanent magnet synchronous motor is higher than the voltage at the side of the inverter, the restarting of the PMSM is forbidden, otherwise, the restarting of the PMSM is allowed. Therefore, in the present disclosure, the low-speed operating condition and the high-speed operating condition correspond to different position angles of the rotor, and the PMSM is started based on the position angle of the rotor.

7 Claims, 10 Drawing Sheets

(51) Int. Cl.
| | | |
|---|---|---|
| *H02P 6/24* | (2006.01) | |
| *H02P 21/18* | (2016.01) | |
| *H02P 21/24* | (2016.01) | |
| *H02P 27/08* | (2006.01) | |
| *H02P 29/10* | (2016.01) | |
| *H02P 1/02* | (2006.01) | |
| *H02P 21/22* | (2016.01) | |
| *H02P 21/36* | (2016.01) | |

(52) U.S. Cl.
CPC ............. *H02P 21/18* (2016.02); *H02P 21/22* (2016.02); *H02P 21/24* (2016.02); *H02P 21/36* (2016.02); *H02P 27/08* (2013.01); *H02P 29/10* (2016.02); *H02P 2207/05* (2013.01)

(58) Field of Classification Search
USPC ...................................... 318/400.02
See application file for complete search history.

(56) References Cited

U.S. PATENT DOCUMENTS

| | | | |
|---|---|---|---|
| 2010/0064706 A1* | 3/2010 | Hattori | H02P 21/34 62/157 |
| 2011/0298399 A1* | 12/2011 | Ogawa | B60G 17/06 318/14 |
| 2014/0333241 A1* | 11/2014 | Zhao | H02P 21/06 318/400.02 |
| 2015/0375855 A1* | 12/2015 | Jaber | H02P 3/22 318/400.26 |

OTHER PUBLICATIONS

International Search Report and Written Opinion of the International Searching Authority corresponding to Application No. PCT/CN2013/089575; dated Jul. 21, 2014.

Wang Gaolin et al. "Hybrid Sensorless Control Strategy for Permanent Magnet Synchronous Motors", Chin. Soc. for Elec. Eng., vol. 32 No. 24 Aug. 25, 2012; pp. 103-109; with Extended Summary in English.

Wen Yu-liang et al., "Calculation Research of Re-starting with Speed for PMSM Based on the Sensor-less", China Academic Journal Electronic Publishing House, pp. 39-42 and 47.

* cited by examiner

CONTROL METHOD FOR RESTARTING PERMANENT MAGNET SYNCHRONOUS MOTOR WITH SPEED, DEVICE AND SYSTEM THEREOF

CROSS REFERENCE TO RELATED APPLICATION

The present disclosure is the national phase of International Application No. PCT/CN2013/089575, titled "CONTROL METHOD FOR RESTRATING PERMANENT MAGNET SYNCHRONOUS MOTOR WITH SPEED, DEVICE AND SYSTEM THEREOF", filed on Dec. 16, 2013, which claims the priority to Chinese Patent Application No. 201310512095.0, titled "CONTROL METHOD FOR RESTARTING PERMANENT MAGNET SYNCHRONOUS MOTOR IN ROTATING CONDITION, DEVICE AND SYSTEM THEREOF", filed on Oct. 25, 2013 with the State Intellectual Property Office of People's Republic of China, the entire content of which is incorporated herein by reference.

TECHNICAL FIELD

The present disclosure relates to the technical field of permanent magnet synchronous motor control, and in particular to a method, a device and a system for controlling restarting of a permanent magnet synchronous motor in a rotating condition.

BACKGROUND

A permanent magnet synchronous motor (PMSM) drive system is a new drive system for controlling a rotating speed and a torque of a permanent magnet synchronous motor by frequency modulation and voltage modulation, which takes the PMSM as a controlled object. Compared with a conventional alternating-current drive system which takes an asynchronous motor as a controlled system, the PMSM drive system has a series of advantages, such as a simple structure, a high power density, a large torque for a low speed output, high efficiency and easy maintenance, which are not matched by the alternating-current drive system. Therefore, the PMSM drive system gradually replaces the asynchronous motor alternating-current drive system and becomes a mainstream in the future.

FIG. 1 shows a schematic diagram of a PMSM drive system in the conventional technology.

A railway permanent magnet traction system may mainly include: a control unit 100, an inverter 200, an isolating contactor 300 and a permanent magnet synchronous motor 400.

The control unit 100 is mainly configured to control operation of the inverter 200, and send a pulse width modulation (PWM) pulse signal to control a switching state of each of switching devices of the inverter 200, so that the inverter 200 output a required voltage to power the permanent magnet synchronous motor 400;

the inverter 200 and the permanent magnet synchronous motor 400 are connected to the isolating contactor 300; and the control unit 100 is also configured to control a switching state of the isolating contactor, to control a connection between the inverter 200 and the permanent magnet synchronous motor 400.

The PMSM 400 is provided with a permanent magnet excitation, and a back electromotive force is generated on a motor terminal of the PMSM 400 as long as the PMSM rotates. The back electromotive force is expressed as:

$$E_0 = \omega_e \psi_f \quad (1),$$

where $E_0$ is the back electromotive force of the PMSM 400, $\omega_e$ is an electrical angular speed of a rotor of the PMSM 400, and the $\psi_f$ is a flux linkage of a permanent magnet.

It can be seen from the formula (1) that an amplitude of the back electromotive force $E_0$ is strictly proportional to the rotating speed $\omega_e$ of the rotor.

Therefore, when the PMSM 400 rotates at a high speed, the back electromotive force may be higher than a voltage at a direct-current side of the inverter 200. If the PMSM 400 idles, and the terminal of the PMSM 400 is directly connected to the inverter 400 instead of being disconnected to the inverter 400 by the isolating contactor 300, all the extra-high back electromotive force generated by the rotation of the PMSM 400 is applied to a capacitor of the inverter 400, which leads to a risk of damage to the capacitor of the inverter 400.

When the inverter 400 malfunctions, if the inverter 400 is still connected to the charged terminal of the PMSM 400, a secondary damage of the inverter 400 may be caused. Therefore, the isolating contactor 300 is added between the PMSM 400 and the inverter 400 in the rail transport and other industrial application fields.

Restarting of the PMSM in a rotating condition refers to the fact that when the PMSM 400 rotates, the inverter 400 is connected to the PMSM 400, that is, the isolating contactor 300 is switched on so that the inverter 400 is connected to the PMSM 400.

In a vector control of the permanent magnet synchronous motor, a current or a voltage of a stator is generally controlled by detecting or estimating a position and an amplitude of a magnetic flux of the rotor of the motor, and the position of the magnetic flux of the rotor may be obtained by detecting an actual position of the current of rotor since the position of the magnetic flux of the rotor is the same as a mechanical position of the rotor. The vector control of the permanent magnet synchronous motor is simpler than a vector control of an asynchronous motor. However, the position of the rotor is generally measured with a mechanical position sensor, which leads to a high cost, an increased volume of the motor and a degraded anti-interference performance of the motor, and causes that the motor is greatly limited by environmental conditions, such as temperature and vibration. Thus the measurement of the position of the rotor by using the mechanical position sensor affects the wide application of the motor. Therefore, for the permanent magnet synchronous motor drive system, a research of a position-sensorless control is a hotspot. Research on the position-sensorless control usually utilizes a direct calculation method, an estimation method based on an observer, a model reference adaptive method or an artificial intelligence method and so on.

Each of the above methods is a method for estimating a position after the motor normally operates, i.e., after a closed-loop control is established. A key to the restarting of the PMSM in a rotating condition is that the position and the speed of the rotor of the PMSM with respect to restarting the PMSM are required to be detected or calculated before the stable closed-loop control system of the motor is established, so that it is ensured that the closed-loop control system is quickly and steadily established after the motor is restarted.

In addition, none of the above methods is considered from a systemic perspective, and the logic of the isolating contactor with respect to restarting the PMSM is not considered, which can not ensure that the closed-loop control system operates steadily after the permanent magnet synchronous motor is restarted.

SUMMARY

The present disclosure is to provide a method for controlling restarting of a permanent magnet synchronous motor in a rotating condition, which can ensure that a closed-loop control system operates steadily after the permanent magnet synchronous motor is started.

A method for controlling restarting of a permanent magnet synchronous motor in a rotating condition is provided according to an embodiment of the present disclosure, which includes:

determining whether a back electromotive force of a permanent magnet synchronous motor is higher than a voltage at a side of an inverter;

controlling an isolating contactor to be switched off and forbidding a restarting of the PMSM in a rotating condition, if the electromotive force of the permanent magnet synchronous motor is higher than the voltage at the side of the inverter;

proceeding to determine whether a rotating speed of a rotor of the permanent magnet synchronous motor is higher than a predetermined rotating speed, if the back electromotive force of the permanent magnet synchronous motor is lower than or equal to the voltage at the side of the inverter;

controlling the permanent magnet synchronous motor to be in a short circuit state, obtaining, a current angle in a $\alpha$–$\beta$ stationary coordinate system, based on a maximum amplitude of a three phase current of the permanent magnet synchronous motor in the short circuit state, calculating a current angle in a dq coordinate system, based on a duration of the short circuit state of permanent magnet synchronous motor, and calculating a position angle of the rotor by subtracting the current angle in the $\alpha$–$\beta$ stationary coordinate system from the current angle in the dq coordinate system, and starting the permanent magnet synchronous motor based on the position angle of the rotor, if the rotating speed of the rotor of the permanent magnet synchronous motor is higher than the predetermined rotating speed; and applying voltage space vectors with different directions to the permanent magnet synchronous motor, measuring the three phase current of the permanent magnet synchronous motor, obtaining the position angle of the rotor based on the three phase current of the permanent magnet synchronous motor, and starting the permanent magnet synchronous motor based on the position angle of the rotor, if the rotating speed of the rotor of the permanent magnet synchronous motor is lower than or equal to the predetermined rotating speed.

Preferably, the process of controlling the permanent magnet synchronous motor to be in a short circuit state, obtaining, a current angle in a $\alpha$–$\beta$ stationary coordinate system, based on a maximum amplitude of a three phase current of the permanent magnet synchronous motor in the short circuit state, calculating a current angle in a dq coordinate system, based on a duration of the short circuit state of the permanent magnet synchronous motor, and calculating a position angle of the rotor by subtracting the current angle in the $\alpha$–$\beta$ stationary coordinate system from the current angle in the dq coordinate system, if the rotating speed of the rotor of the permanent magnet synchronous motor is higher than the predetermined rotating speed includes:

applying zero voltage vectors, to put the permanent magnet synchronous motor into the short circuit state;

calculating a current in the dq coordinate system, based on the duration of the short circuit state of permanent magnet synchronous motor:

$$\begin{bmatrix} i_d \\ i_q \end{bmatrix} = \begin{bmatrix} -\frac{\phi_f}{L_d}(1-\cos(\omega T_{sh})) \\ \frac{\phi_f}{L_q}\sin(\omega T_{sh}) \end{bmatrix}$$

where $T_{sh}$ is the duration of the short circuit state of permanent magnet synchronous motor, $L_d$ and $L_q$ are a direct-axis synchronous inductance and a quadrature-axis synchronous inductance respectively, $\phi_f$ is a flux linkage of a permanent magnet, and $i_d$ and $i_q$ are components of the current of a stator along the direct-axis and the quadrature-axis respectively which are called a direct-axis current and a quadrature-axis current respectively;

resolving a maximum amplitude of the three phase current into $i_\alpha$ and $i_\beta$ in the $\alpha$–$\beta$ stationary coordinate system, and defining $\theta_{I_{\alpha\beta}}$ as the current angle of $i_{T_{sh}}$ in the $\alpha$–$\beta$ stationary coordinate system:

$$\theta_{I_{\alpha\beta}} = \tan^{-1}\left(\frac{i_\alpha}{i_\beta}\right)$$

calculating the current angle $\theta_{I_{dq}}$ of the maximum amplitude of the three phase current in the dq coordinate system based on the following equation:

$$\theta_{I_{dq}} \cong \tan^{-1}\left(\frac{i_q}{i_d}\right) = \tan^{-1}\left(\frac{-\frac{\varphi_f}{L_q}\sin(\omega_e T_{sh})}{-\frac{\varphi_f}{L_d}(1-\cos(\omega_e T_{sh}))}\right)$$

and calculating the position angle of the rotor based on the following equation:

$$\theta_e = \theta_{I_{dp}} - \theta_{I_{\alpha\beta}}.$$

Preferably, the process of applying voltage space vectors with different directions to the permanent magnet synchronous motor and measuring the three phase current of the permanent magnet synchronous motor includes:

applying voltage space vectors $\vec{u}_{s1}$ and $\vec{u}_{s4}$ alternately and successively for respective predetermined periods of time, to obtain a A-phase current of the permanent magnet synchronous motor;

blocking a drive pulse of the inverter for N milliseconds, where N is a predetermined integer;

applying voltage space vectors $\vec{u}_{s2}$ and $\vec{u}_{s5}$ alternately and successively for respective predetermined periods of time, to obtain a B-phase current of the permanent magnet synchronous motor;

blocking the drive pulse of the inverter for N milliseconds; and applying voltage space vectors $\vec{u}_{s3}$ and $\vec{u}_{s6}$ alternately and successively for respective predetermined periods of time, to obtain a C-phase current of the permanent magnet synchronous motor, where $\vec{u}_{s1}$, $\vec{u}_{s2}$, $\vec{u}_{s3}$, $\vec{u}_{s4}$, $\vec{u}_{s5}$ and $\vec{u}_{s6}$ are space vectors, phases of which sequentially have a difference of 60 degrees in an anti-clockwise direction.

Preferably, the process of obtaining the position angle of the rotor based on the three phase current of the permanent magnet synchronous motor includes:

obtaining the position angle of the rotor based on the following equation:

$$\hat{\theta}_e = \frac{\arg(f) - \pi}{2}$$

where f is a deviation of the three phase current in a form of a space vector:

$$f(\Delta i_s) = \sqrt{\frac{2}{3}} \left[ \Delta i_A + \Delta i_B e^{j\left(\frac{2\pi}{3}\right)} + \Delta i_C e^{j\left(\frac{4\pi}{3}\right)} \right]$$

and $$\Delta i_A = \frac{|\vec{u}_s|}{L_d L_q} [(L_d + L_q) - (L_d - L_q)\cos 2\theta_e] \Delta t,$$

$$\Delta i_B = \frac{|\vec{u}_s|}{L_d L_q} [(L_d + L_q) - (L_d - L_q)\cos 2(\theta_e - 4\pi/3)] \Delta t \text{ and}$$

$$\Delta i_C = \frac{|\vec{u}_s|}{L_d L_q} [(L_d + L_q) - (L_d - L_q)\cos 2(\theta_e - 2\pi/3)] \Delta t.$$

Preferably, the back electromotive force of the permanent magnet synchronous motor is calculated based on the following equation:

$$E_0 = \omega_e \psi_f$$

where $E_0$ is the back electromotive force of the permanent magnet synchronous motor, $\omega_e$ is the electrical angular speed of the rotor of the permanent magnet synchronous motor, and $\psi_f$ is the flux linkage of the permanent magnet.

A device for controlling restarting of a permanent magnet synchronous motor in a rotating condition is further provided according to an embodiment of the present disclosure, which includes: a voltage determining unit, an insolating contactor controlling unit, a rotor rotating speed determining unit, a high-speed rotor position angle obtaining unit and a low-speed rotor position angle obtaining unit, where the voltage determining unit is configured to determine whether a back electromotive force of a permanent magnet synchronous motor is higher than a voltage at a side of an inverter;

the isolating contactor controlling unit is configured to control an isolating contactor to be switched off and forbid a restarting of PMSM in a rotating condition in a case that the voltage determining unit determines that the back electromotive force of the permanent magnet synchronous motor is higher than the voltage at the side of the inverter;

the rotor rotating speed determining unit is configured to determine whether a rotating speed of a rotor of the permanent magnet synchronous motor is higher than a predetermined rotating speed in a case that the voltage determining unit determines that the electromotive force of the permanent magnet synchronous motor is lower than or equal to the voltage at the side of the inverter;

the high-speed rotor position angle obtaining unit is configured to control the permanent magnet synchronous motor to be in a short circuit state, obtain a current angle in a α–β stationary coordinate system based on a maximum amplitude of a three phase current of the permanent magnet synchronous motor in the short circuit state, calculate a current angle in a dq coordinate system based on a duration of the short circuit state of permanent magnet synchronous motor, and calculate a position angle of the rotor by subtracting the current angle in the α–β stationary coordinate system from the current angle in the dq coordinate system, and start the permanent magnet synchronous motor based on the position angle of the rotor, in a case that the rotor rotating speed determining unit 903 determines that the rotating speed of the rotor of the permanent magnet synchronous motor is higher than the predetermined rotating speed; and the low-speed rotor position angle obtaining unit is configured to apply voltage space vectors with different directions to the permanent magnet synchronous motor, measure the three phase current of the permanent magnet synchronous motor, obtain the position angle of the rotor based on the three phase current of the permanent magnet synchronous motor, and start the permanent magnet synchronous motor based on the position angle of the rotor, in a case that the rotor rotating speed determining unit determines that the rotating speed of the rotor of the permanent magnet synchronous motor is lower than or equal to the predetermined rotating speed.

Preferably, the high-speed rotor position angle obtaining unit includes:

a subunit for controlling a short circuit state of a motor, configured to apply zero voltage vectors, to put the permanent magnet synchronous motor into the short circuit state;

a subunit for obtaining a current angle of a short-circuit current of a motor in the α–β stationary coordinate system, configured to:

obtain a current angle of a current in the α–β stationary coordinate system based on the following equation;

calculate the current in the dq coordinate system based on the duration of the short circuit state of permanent magnet synchronous motor:

$$\begin{bmatrix} i_d \\ i_q \end{bmatrix} = \begin{bmatrix} -\frac{\phi_f}{L_d}(1 - \cos(\omega T_{sh})) \\ \frac{\phi_f}{L_q} \sin(\omega T_{sh}) \end{bmatrix}$$

where $T_{sh}$ is the duration of the short circuit state of permanent magnet synchronous motor, $L_d$ and $L_q$ are a direct-axis synchronous inductance and a quadrature-axis synchronous inductance respectively, $\phi_f$ is a flux linkage of a permanent magnet, and $i_d$ and $i_q$ are components of the current of a stator along the direct axis and the quadrature axis respectively which are called a direct-axis current and a quadrature-axis current respectively; and resolve a maximum amplitude of the three phase current into $i_\alpha$ and $i_\beta$ in the α–β stationary coordinate system, and define $\theta_{I_{\alpha\beta}}$ as the current angle of the $i_{T_{sh}}$ in the α–β stationary coordinate system:

$$\theta_{I_{\alpha\beta}} = \tan^{-1}\left(\frac{i_\alpha}{i_\beta}\right)$$

a subunit for obtaining a current angle of a short-circuit current of a motor in the dq coordinate system, configured to obtain the current angle of the current of the motor in the dq coordinate system based on the following equation:

$$\theta_{I_{dq}} \cong \tan^{-1}\left(\frac{i_q}{i_d}\right) = \tan^{-1}\left(\frac{-\frac{\varphi_f}{L_q}\sin(\omega_e T_{sh})}{-\frac{\varphi_f}{L_d}(1-\cos(\omega_e T_{sh}))}\right)$$

and a first obtaining unit for obtaining a position angle of a rotor, configured to calculate the position angle of the rotor based on the following equation $\theta_e = \theta_{I_{dq}} - \theta_{I_{\alpha\beta}}$.

Preferably, the low-speed rotor position angle obtaining unit includes a voltage space vector applying subunit, a three phase current obtaining subunit and a drive pulse blocking subunit, where the voltage space vector applying subunit is configured to alternately and successively apply voltage space vectors $\vec{u}_{s1}$ and $\vec{u}_{s4}$ for respective predetermined periods of time; the three phase current obtaining subunit is configured to obtain a A-phase current of the permanent magnet synchronous motor; and the drive pulse blocking subunit is configured to block a drive pulse of the inverter for N milliseconds, where N is a predetermined integer;

the voltage space vector applying subunit is configured to alternately and successively apply voltage space vectors $\vec{u}_{s2}$ and $\vec{u}_{s5}$ for respective predetermined periods of time, to obtain a B-phase current of the permanent magnet synchronous motor; and the drive pulse blocking subunit is configured to block the drive pulse of the inverter for N milliseconds, where N is a predetermined integer;

the voltage space vector applying subunit is configured to alternately and successively apply voltage space vectors $\vec{u}_{s3}$ and $\vec{u}_{s6}$ for respective predetermined periods of time, to obtain a C-phase current of the permanent magnet synchronous motor; and $\vec{u}_{s1}$, $\vec{u}_{s2}$, $\vec{u}_{s3}$, $\vec{u}_{s4}$, $\vec{u}_{s5}$ and $\vec{u}_{s6}$ are space vectors phases of which sequentially have a difference of 60 degrees in an anti-clockwise direction.

A control system for controlling restarting of a permanent magnet synchronous motor in a rotating condition is further provided according to an embodiment of the present disclosure, which includes a control unit, a permanent magnet synchronous motor, an inverter and an isolating contactor, where the control unit is configured to control the isolating contractor to be switched on or off; the inverter and the permanent magnet synchronous motor are connected to the isolating contactor;

the control unit is further configured to output pulse signals to control switching devices of the inverter to be switched on or off; and the control unit is further configured to:

determine whether a back electromotive force of the permanent magnet synchronous motor is higher than a voltage at a side of the inverter;

control an isolating contactor to be switched off and forbidding a restarting of the permanent magnet synchronous motor in a rotating condition, if the electromotive force of the permanent magnet synchronous motor is higher than the voltage at the side of the inverter;

proceed to determine whether a rotating speed of a rotor of the permanent magnet synchronous motor is higher than a predetermined rotating speed, if the electromotive force of the permanent magnet synchronous motor is lower than or equal to the voltage at the side of the inverter;

control the permanent magnet synchronous motor to be in a short circuit state, obtain, an current angle in a $\alpha$-$\beta$ stationary coordinate system, based on a maximum amplitude of a three phase current of the permanent magnet synchronous motor in the short circuit state, calculate a current angle in a dq coordinate system, based on a duration of the short circuit state of permanent magnet synchronous motor, and calculate a position angle of the rotor by subtracting the current angle in the $\alpha$-$\beta$ stationary coordinate system from the current angle in the dq coordinate system, and start the permanent magnet synchronous motor based on the position angle of the rotor, if the rotating speed of the rotor of the permanent magnet synchronous motor is higher than the predetermined rotating speed; and apply voltage space vectors with different directions to the permanent magnet synchronous motor, measure the three phase currents of the permanent magnet synchronous motor, obtain the position angle of the rotor based on the three phase currents of the permanent magnet synchronous motor, and start the permanent magnet synchronous motor based on the position angle of the rotor, if the rotating speed of the rotor of the permanent magnet synchronous motor is lower than or equal to the predetermined rotating speed.

Preferably, the process of applying voltage space vectors with different directions to the permanent magnet synchronous motor and measuring the three phase current of the permanent magnet synchronous motor includes:

applying voltage space vectors $\vec{u}_{s1}$ and $\vec{u}_{s4}$ alternately and successively for respective predetermined periods of time, to obtain a A-phase current of the permanent magnet synchronous motor;

blocking a drive pulse of the inverter for N milliseconds, where N is a predetermined integer;

applying voltage space vectors $\vec{u}_{s2}$ and $\vec{u}_{s5}$ alternately and successively for respective predetermined periods of time, to obtain a B-phase current of the permanent magnet synchronous motor;

blocking the drive pulse of the inverter for N milliseconds; and applying voltage space vectors $\vec{u}_{s3}$ and $\vec{u}_{s6}$ alternately and successively for respective predetermined periods of time, to obtain a C-phase current of the permanent magnet synchronous motor, where $\vec{u}_{s1}$, $\vec{u}_{s2}$, $\vec{u}_{s3}$, $\vec{u}_{s4}$, $\vec{u}_{s5}$ and $\vec{u}_{s6}$ are space vectors phases of which sequentially have a difference of 60 degrees in an anti-clockwise direction.

Compared with the conventional technology, the present disclosure has the following advantages.

From a systemic perspective, the electrical angular speed $\omega_e$ of the PMSM is obtained based on the speed of the trailer so as to obtain the back electromotive force of the PMSM. The back electromotive force is compared with the voltage at the side of the inverter, and if the electromotive force of the permanent magnet synchronous motor is higher than the voltage at the side of the inverter, the restarting of the PMSM in the rotating condition is forbidden, otherwise, the restarting of the PMSM in the rotating condition is allowed. The restarting of the PMSM in the rotating condition refers to switching on the isolating contactor, and the forbidding the restarting of the PMSM in the rotating condition refers to switching off the isolating contactor. The acquisition of the position angle of the rotor is required by the restarting of the PMSM in the rotating condition. Therefore, in the present disclosure, the low-speed operating condition and the high-speed operating condition for calculating the position angle of the rotor are determined according to the magnitude of $\omega_e$. The two operating conditions correspond to different position angles of the rotor, and the PMSM is started based on the position angle of the rotor. Based on the method according to the present disclosure, an overall control method is proposed from a systemic perspective, the restarting of the PMSM in the rotating condition is forbidden when the PMSM rotates at a high speed (the back electromotive force corresponding to the high speed is too high), a restarting position is determined by calculating the position angle of the rotor with the primary short-circuit method when the PMSM rotates at the high speed, and the restarting position is determined by calculating the position angle of the rotor with the an indirect flux detection by on-line reactance measurement (INFORM) method when the PMSM rotates at the low speed.

BRIEF DESCRIPTION OF THE DRAWINGS

To illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION OF THE EMBODIMENTS

In order to enable the person of skill in the art to better understand and achieve the technical solutions of the present disclosure, some basic operating principles of a permanent magnet synchronous motor are introduced hereinafter.

Firstly, a steady state mathematical model of the PMSM is described.

In order to simplify the analysis and reduce dimensions of an equation, a mathematical model of the permanent magnet synchronous motor in a dq synchronous rotating coordinate system is employed. A voltage equation and a flux-linkage equation of the permanent magnet synchronous motor in the dq synchronous rotating coordinate system may be respectively expressed as equation (1) and equation (2):

$$\left.\begin{array}{l} u_d = i_d \cdot R - \omega_e \cdot L_q \cdot i_q \\ u_q = i_q \cdot R + \omega_e \cdot L_d \cdot i_d + \omega_e \cdot \psi_f \end{array}\right\} \quad (1)$$

$$\left.\begin{array}{l} \psi_d = \psi_f + L_d \cdot i_d \\ \psi_q = L_q \cdot i_q \\ \psi_s = \sqrt{(\psi_f + L_d \cdot i_d)^2 + (L_q \cdot i_q)^2} \end{array}\right\} \quad (2)$$

where $i_d$ and $i_q$ are respective components of a current of a stator along d axis and q axis, $u_d$ and $u_q$ are respective components of a voltage of a stator along d axis and q axis, $\psi_d$ and $\psi_q$ are respective components of a flux linkage of a stator along d axis and q axis $L_d$ and the $L_q$ are a direct-axis synchronous inductance and a quadrature-axis synchronous respectively, $\omega_e$ is an electrical angular speed of a motor, $\omega_e = n_p \omega_r$ ($n_p$ is the number of pole pairs in the motor, and $\omega_r$ is a mechanical angular speed of the motor), p is a differential operator, and $$p = \frac{d}{dt}.$$

Figure 1:
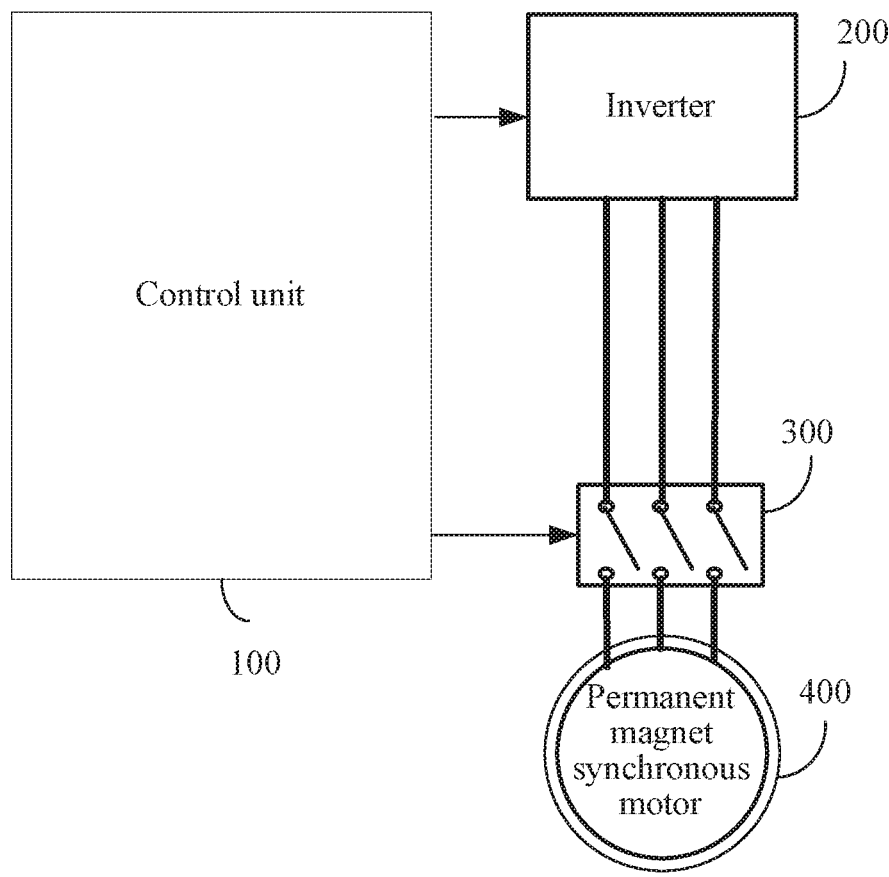
FIG. 1 is a schematic diagram of a PMSM drive system in the conventional technology.
Figure 2:
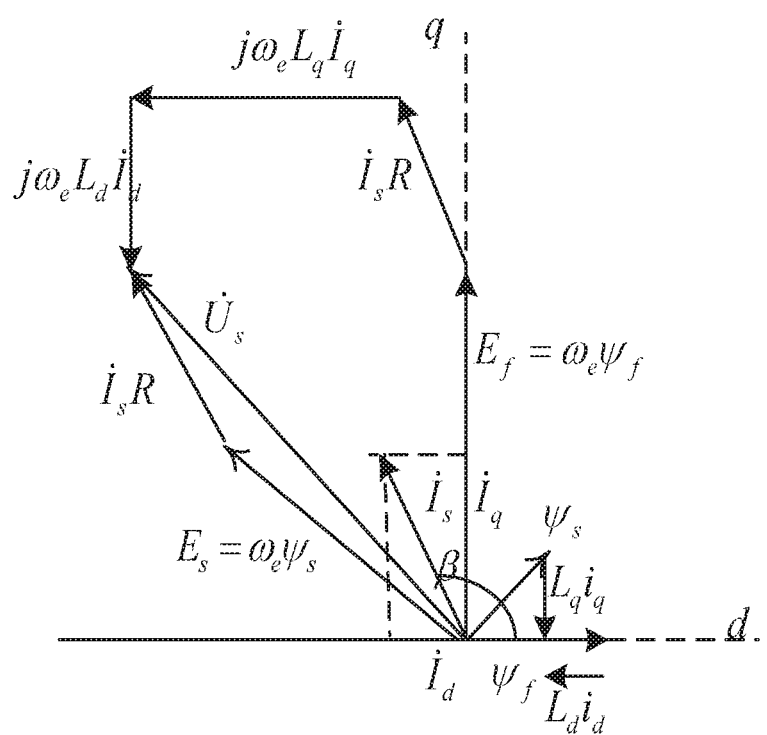
FIG. 2 is a diagram of voltage phasors of a permanent magnet synchronous motor.

In a steady state, the voltage equation (1) may be simplified into the following equations (3) and (4), and a specific principle thereof may refer to FIG. 2. FIG. 2 is a diagram of voltage phasors of a permanent magnet synchronous motor:

$$u_d = R_s i_d - \omega_e L_q i_q \quad (3)$$

$$u_q = R_s i_q + \omega_e L_d i_d + \omega_e \psi_f \quad (4).$$

The technical solutions in embodiments of the present disclosure are clearly and completely described hereinafter in conjunction with the drawings in the embodiments of the present disclosure. Apparently, the described embodiments are only a few embodiments other than all embodiment of the present disclosure. Based on the embodiments of the present disclosure, all other embodiments obtained by those skilled in the art without any creative efforts fall within the scope of the present disclosure.

In order to make the object, the features and the advantages of the present disclosure more clear, the embodiments of the present disclosure are clearly described hereinafter in conjunction with the drawings.

First Method Embodiment

Figure 3:
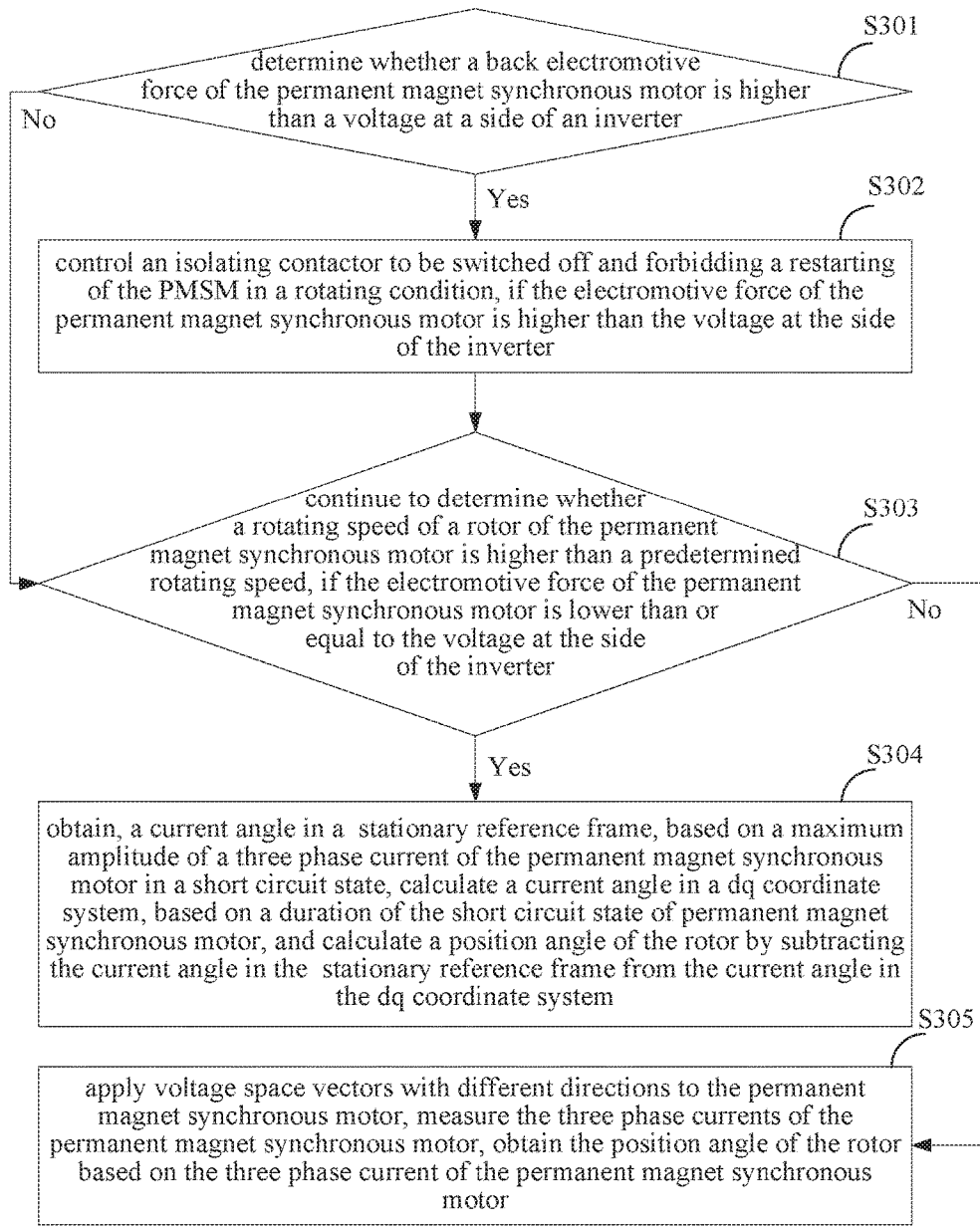
FIG. 3 is a flow chart of a method for controlling restarting of a permanent magnet synchronous motor in a rotating condition according to a first method embodiment of the present disclosure.

FIG. 3 is a flow chart of a control method for restarting of a permanent magnet synchronous motor in a rotating condition according to a first method embodiment of the present disclosure.

Firstly, an operation principle according to the present disclosure is described.

It can be seen from the equation (1) that with a sufficient rotating speed $\omega_e$, a back electromotive force $E_0$ is higher than a voltage $U_{dc}$ at an intermediate direct-current side of an inverter. In this case, if the restarting of the PMSM in the rotating condition is performed and an isolating contactor is switched on, then the direct-current side of the inverter may be reversely charged by the PMSM. A capacitor at the direct-current side of the inverter may be charged with a voltage, an amplitude of which is higher than a safety limit of the capacitor, thereby damaging the capacitor.

Therefore, the PMSM in the rotating condition can not be restarted with all rotating speeds and whether the restarting can be performed needs to be determined based on the rotating speed of the PMSM with respect to restarting the PMSM. The method according to the embodiment of the present disclosure is safety-orientated based on the rail transport, and a restarting logic is explicitly determined based on a speed of a trailer from a systemic perspective.

It should be noted that the rotating speed $\omega_e$ of the PMSM may be obtained based on the speed of the trailer.

The technical solutions of the present disclosure are described in detail hereinafter in conjunction with the flow chart.

In step S301, whether a back electromotive force of a permanent magnet synchronous motor is higher than a voltage at a side of an inverter is determined.

It should be noted that, the back electromotive force of the permanent magnet synchronous motor may be obtained based on equation (1), where $\omega_e$ may be obtained based on a speed of a trailer.

For convenience of determination, a voltage at a direct-current side of the inverter may be taken as a criterion for the voltage at the side of the inverter. For example, the voltage at the side of the inverter may be $U_{dc}/\sqrt{3}$.

In step S302, an isolating contactor is controlled to be switched off and a restarting of the PMSM in a rotating condition is forbidden, if the back electromotive force of the permanent magnet synchronous motor is higher than the voltage at the side of the inverter.

This step is to ensure safety of a capacitor at the direct-current side of the inverter.

In step S303, whether a rotating speed of a rotor of the permanent magnet synchronous motor is higher than a predetermined rotating speed is determined, if the electromotive force of the permanent magnet synchronous motor is lower than or equal to the voltage at the side of the inverter.

If the electromotive force of the permanent magnet synchronous motor is lower than or equal to the voltage at the side of the inverter, then the isolating contactor is allowed to be switched on, and the PMSM can be started only when a position angle of the rotor is further acquired. Therefore, it is required that $\omega_e$ is obtained based on the speed of the trailer in the following step, and there are two ways for acquiring the position angle of the rotor according to the magnitude of $\omega_e$. The first way is to acquire the position angle of the rotor in a low-speed operating condition, and the second way is to acquire the position angle of the rotor in a high-speed operating condition.

In step S304, the permanent magnet synchronous motor is controlled to be in a short circuit state, a current angle in a α-β stationary coordinate system is obtained based on a maximum amplitude of a three-phase current of the permanent magnet synchronous motor in the short circuit state, a current angle in a dq coordinate system is calculated based on a duration of the short circuit state of permanent magnet synchronous motor, and the position angle of the rotor is calculated by subtracting the current angle in the α-β stationary coordinate system from the current angle in the dq coordinate system, and the permanent magnet synchronous motor is started based on the position angle of the rotor, if the rotating speed of the rotor of the permanent magnet synchronous motor is higher than the predetermined rotating speed.

The method according to the step S304 may be referred as a primary short-circuit method. The position angle of the rotor at a high speed may be obtained based on the primary short-circuit method, so that an initial position of the rotor is acquired to start the PMSM.

In step S305, voltage space vectors with different directions are applied to the permanent magnet synchronous motor, the three-phase current of the permanent magnet synchronous motor is measured, the position angle of the rotor is obtained based on the three-phase current of the permanent magnet synchronous motor, and the permanent magnet synchronous motor is started based on the position angle of the rotor, if the rotating speed of the rotor of the permanent magnet synchronous motor is lower than or equal to the predetermined rotating speed.

The method according the step S305 is mainly based on an indirect flux detection by on-line reactance measurement (INFORM) method.

In the method according to the present disclosure, from a systemic perspective, the electrical angular speed $\omega_e$ of the PMSM is obtained based on the speed of the trailer so as to obtain the back electromotive force of the PMSM. The back electromotive force is compared with the voltage at the side of the inverter, and if the electromotive force of the permanent magnet synchronous motor is higher than the voltage at the side of the inverter, the restarting of the PMSM in the rotating condition is forbidden, otherwise, the restarting of the PMSM in the rotating condition is allowed. The restarting of the PMSM in the rotating condition refers to switching on the isolating contactor, and the forbidding the restarting of the PMSM in the rotating condition refers to switching off the isolating contactor. The acquisition of the position angle of the rotor is required by the restarting of the PMSM in the rotating condition. Therefore, in the present disclosure, the low-speed operating condition and the high-speed operating condition for calculating the position angle of the rotor are determined according to the magnitude of $\omega_e$. The two operating conditions correspond to different position angles of the rotor, and the PMSM is started based on the position angle of the rotor. Based on the method according to the present disclosure, an overall control method is proposed from a systemic perspective, the restarting of the PMSM in the rotating condition is forbidden when the PMSM rotates at a high speed (the back electromotive force corresponding to the high speed is too high), a restarting position is determined by calculating the position angle of the rotor with the primary short-circuit method when the PMSM rotates at the high speed, and the restarting position is determined by calculating the position angle of the rotor with the INFORM method when the PMSM rotates at the low speed.

Second Method Embodiment

The process of obtaining the position of the rotor with the primary short-circuit method when the PMSM rotates at a high speed according to the present disclosure is described in detail hereinafter in conjunction with the drawings.

Figure 4:
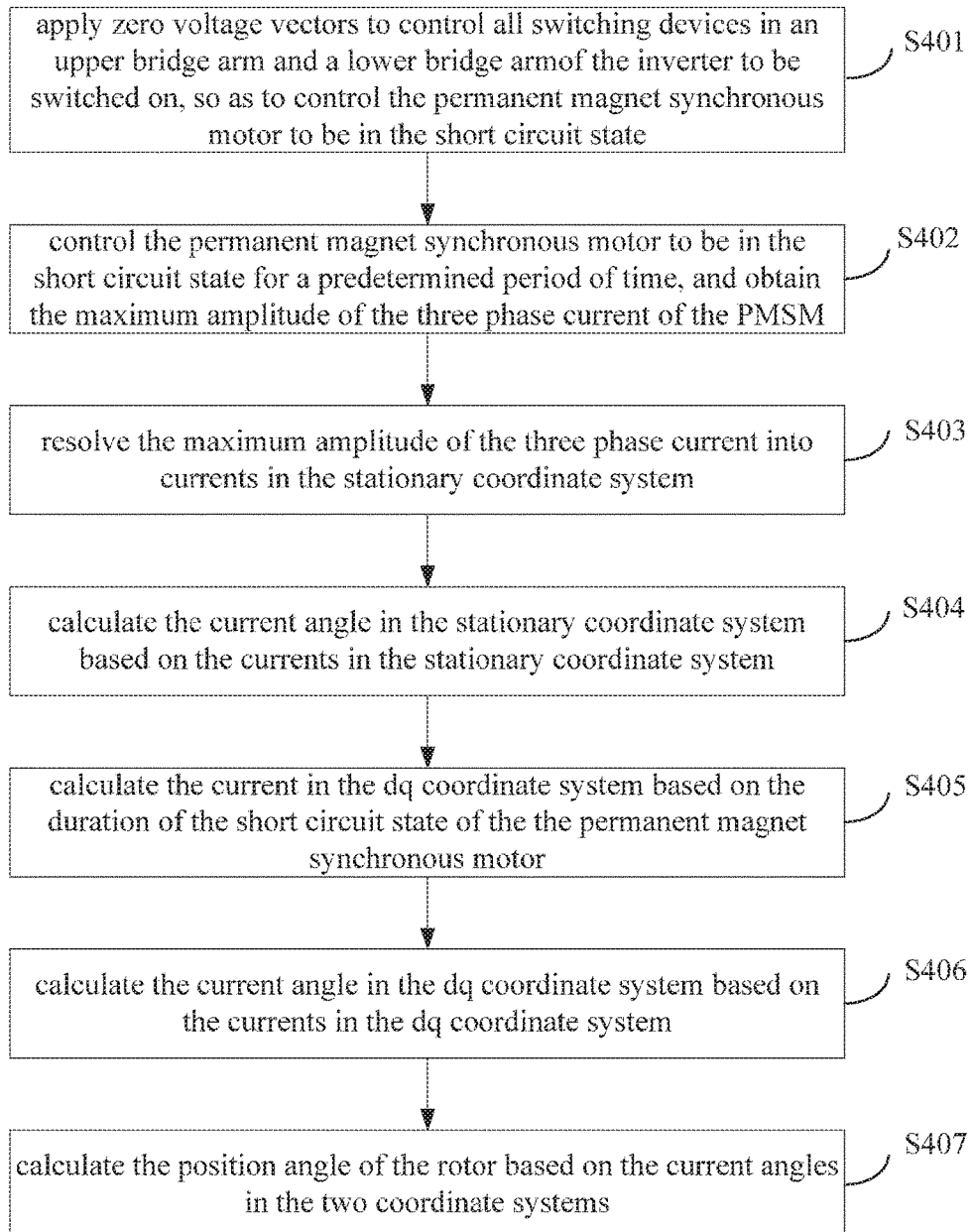
FIG. 4 is a flow chart of a primary short-circuit method of a PMSM rotating at a high speed according to an embodiment of the present disclosure.

FIG. 4 is a flow chart of a primary short-circuit method of a PMSM rotating at a high speed according to the present disclosure.

Since a back electromotive force is generated when a PMSM idles, position information of a rotor is included in a three phase short-circuit current if three phases of the PMSM are controlled to be in the short circuit state. Therefore, the position of the rotor may be obtained with the short-circuit method.

In step S401, zero voltage vectors are applied, to put the permanent magnet synchronous motor into the short circuit state.

It should be noted that there are two zero voltage vectors, which are $\vec{u}_{s0}$ and $\vec{u}_{s7}$. That is, the two different zero voltage vectors may be applied, to control all switching devices in an upper bridge arm of the inverter to be switched on or all switching devices in a lower bridge arm of the inverter to be switched on. When all the switching devices in the upper bridge arm are switched on, the permanent magnet synchronous motor may be in the short-circuit state; and when all the switching devices in the lower bridge arm are switched on, the permanent magnet synchronous motor may also be in the short circuit state. It is not limited in the embodiments of the present disclosure that whether all the switching devices in the upper bridge arm or all the switching devices in the lower bridge arm are switched on.

In step S402, the permanent magnet synchronous motor is kept being in the short circuit state for a predetermined period of time $T_{sh}$, and the maximum amplitude of the three phase current of the PMSM is acquired.

In step S403, the maximum amplitude of the three phase current is resolved into $i_\alpha$ and $i_\beta$ in the α-β stationary coordinate system.

In step S404, a current angle in the α-β stationary coordinate system is calculated based on the currents $i_\alpha$ and $i_\beta$ in the α-β stationary coordinate system with the following equation:

$$\theta_{I_{\alpha\beta}} = \tan^{-1}\left(\frac{i_\alpha}{i_\beta}\right) \quad (5)$$

In step S405, currents $i_d$ and $i_q$ in the dq coordinate system are calculated based on the duration of the short circuit state of permanent magnet synchronous motor.

If a time constant of a stator winding in the q axis is much greater than $T_{sh}$, then $R_m$ may be ignored.

In a case that the resistance of the stator is ignored and all the switching devices of the inverter are switched on, the PMSM is in the short circuit state, and a terminal voltage of the PMSM is equal to zero, i.e., $v_d=0$ and $v_q=0$, so that equations (3) and (4) may be simplified into the following equations:

$$\begin{bmatrix} 0 \\ 0 \end{bmatrix} = \begin{bmatrix} pL_d & -\omega L_q \\ \omega L_d & pL_q \end{bmatrix}\begin{bmatrix} i_d \\ i_q \end{bmatrix} + \varphi_f \omega \begin{bmatrix} 0 \\ 1 \end{bmatrix} \quad (6)$$

A short-circuit current vector of the PMSM is expressed as: $\vec{i} = [i_d\ i_q]^T$, and it is assumed that ω is a constant and an initial current is zero, then equation (7) may be obtained by performing a Laplace transform on equation (6):

$$i = \begin{bmatrix} i_d \\ i_q \end{bmatrix} = \begin{bmatrix} -\frac{\phi_f}{L_d}(1-\cos(\omega T_{sh})) \\ \frac{\phi_f}{L_q}\sin(\omega T_{sh}) \end{bmatrix} \quad (7)$$

That is, currents $i_d$ and $i_q$ in the dq coordinate system may be calculated based on equation (7).

In step S406, the current angle in the dq coordinate system is calculated based on currents $i_d$ and $i_q$ in the dq coordinate system, which is expressed as the following equation:

$$\theta_{I_{dq}} \cong \tan^{-1}\left(\frac{i_q}{i_d}\right) = \tan^{-1}\left(\frac{-\frac{\phi_f}{L_q}\sin(\omega_e T_{sh})}{-\frac{\phi_f}{L_d}(1-\cos(\omega_e T_{sh}))}\right) = \tan^{-1}\left(\frac{L_d\ \sin(\omega_e T_{sh})}{L_q(1-\cos(\omega_e T_{sh}))}\right) \quad (7)$$

Figure 5:
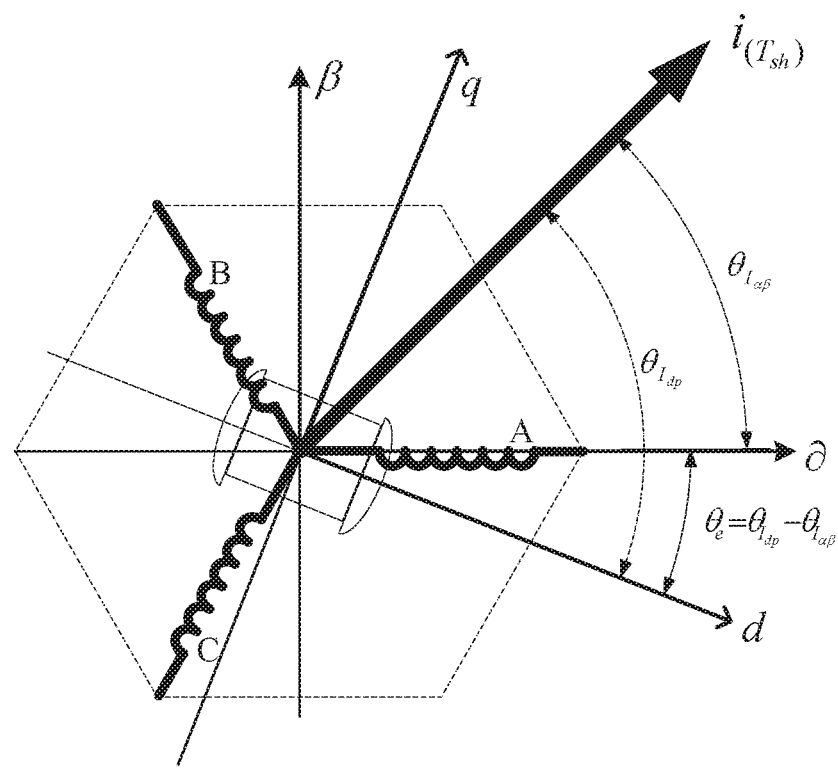
FIG. 5 is a schematic diagram of current angles of a current vector in different coordinate systems according to an embodiment of the present disclosure.

Reference is made to FIG. 5, which is a schematic diagram of a current angle of a current vector in different coordinate systems. In FIG. 5, two coordinate systems are depicted in the same drawing, that is, the dq coordinate system and the α-β stationary coordinate system are shown in FIG. 5.

In step S407, the position angle of the rotor is calculated based the current angles in the two coordinate systems respectively, which is expressed as the following equation:

$$\theta_e = \theta_{I_{dp}} - \theta_{I_{\alpha\beta}} \quad (8)$$

The process of obtaining the position angle of the rotor when the PMSM rotates at the high speed by using the primary short-circuit method according to the present disclosure is described in detail. That is, the position angle is obtained with equation (8) based on a result of the equations (5) and (7).

It should be noted that, if a current of an armature is not zero before the PMSM is short-circuited, then all the switching devices of the inverter are controlled to be switched off, so that the current of the armature is zero, in this case, the PMSM is in a disconnecting state.

Third Method Embodiment

The process of obtaining the position of the rotor with the INFORM method when the PMSM rotates at a low speed according to the present disclosure is described hereinafter.

Figure 6:
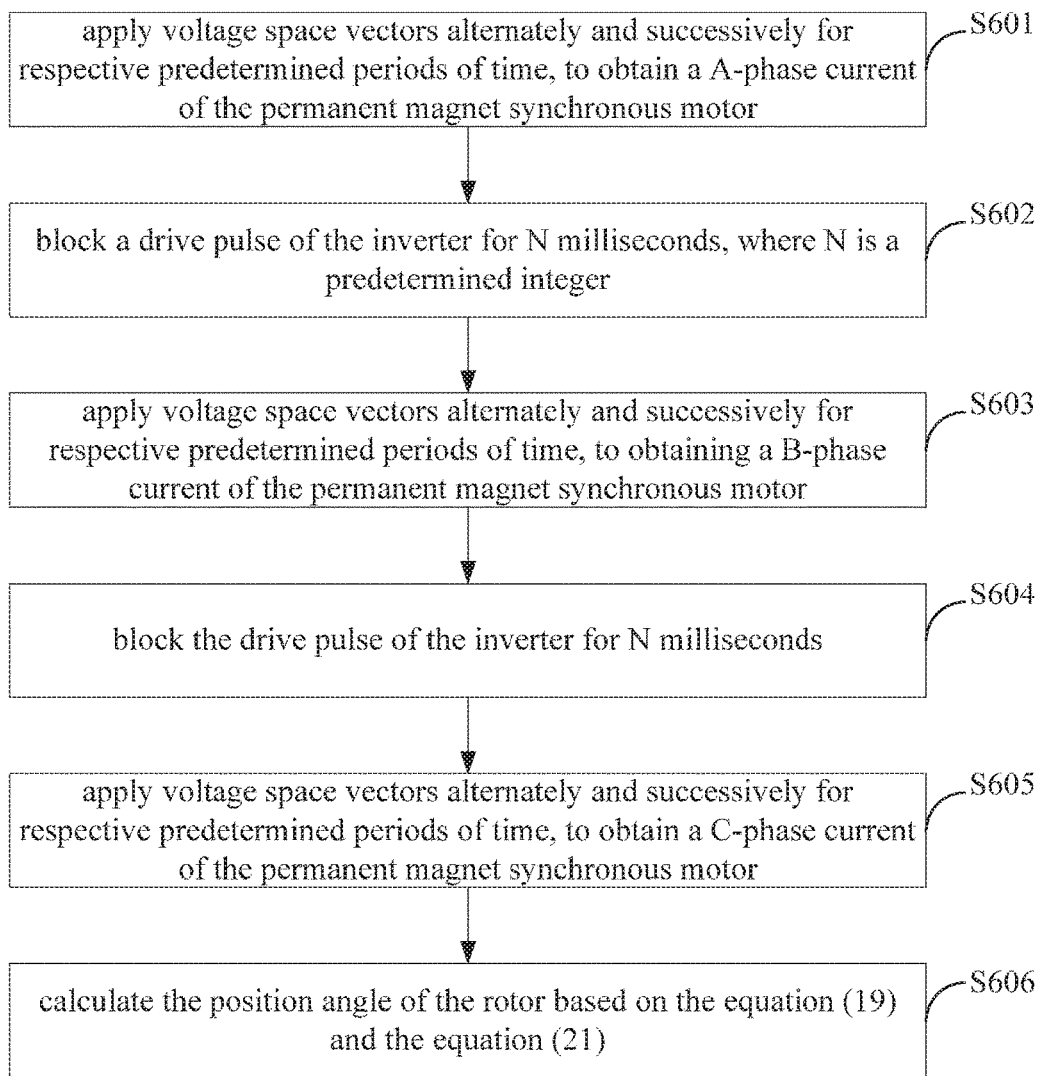
FIG. 6 is a flow chart of calculating a position angle of a rotor with an INFORM method according to an embodiment of the present disclosure.

Reference is made to FIG. 6, which is a flow chart of calculating a position angle of a rotor with the INFORM method according to the present disclosure.

The basic principle of the INFORM method is firstly described: voltage space vectors are applied to terminals of the motor from different directions, and the position of the rotor is estimated by measuring different current responses of the voltage space vectors.

A basic principle utilized in the method is that: a magnetic circuit of the motor has a saliency, and an inductance of the stator winding is a function of the position of the rotor, thus position information of the rotor is included in current responses generated by voltage space vectors at different positions.

Since the applied voltage space vectors are high-frequency voltage signals, the current responses are also high-frequency signals, and the model of the motor may be expressed as vector equations, as follows:

$$\vec{u}_s = \vec{L}_s(\theta_e) \frac{d\vec{i}_s}{dt} \tag{9}$$

$$\frac{d\vec{i}_s}{dt} = [\vec{L}_s(\theta_e)]^{-1} \vec{u}_s \tag{10}$$

$$[\vec{L}_s(\theta_e)]^{-1} = \begin{pmatrix} L_0 + \Delta L \cos 2\theta_e & \Delta L \sin 2\theta_e \\ \Delta L \sin 2\theta_e & L_0 + \Delta L \cos 2\theta_e \end{pmatrix}^{-1} = \tag{11}$$

$$\frac{1}{L_d L_q} \begin{pmatrix} L_0 - \Delta L \cos 2\theta_e & -\Delta L \sin 2\theta_e \\ -\Delta L \sin 2\theta_{er} & L_0 + \Delta L \cos 2\theta_e \end{pmatrix} =$$

$$\frac{1}{L_0^2 - \Delta L^2} \begin{pmatrix} L_0 - \Delta L \cos 2\theta_e & -\Delta L \sin 2\theta_e \\ -\Delta L \sin 2\theta_e & L_0 + \Delta L \cos 2\theta_e \end{pmatrix}$$

It can be seen from the equation (1) that, under an effect of the voltage space vector in a direction, the current response is dependent on an inductance matrix, and the inductance of the stator winding changes with the position of the electrical angle of rotor.

It can be understood that the voltage space vector may be generated by various ways during an actual implementation, and a simple way is to directly use the inverter in the system. For example, as the voltage space vectors shown in FIG. 7, the voltage space vectors are alternately applied along axes of A, B and C windings in a forward direction and a reverse direction respectively.

For example, for A-axis of the PMSM, $\vec{u}_{s1}$ and $\vec{u}_{s4}$ may be applied, where $\vec{u}_{s1}$ and $\vec{u}_{s4}$ are pulse-width-modulation switching voltage vectors generated by the inverter. Since a switching frequency of the inverter is very high, the applied $\vec{u}_{s1}$ and $\vec{u}_{s4}$ are high-frequency stator voltage signals. For B-axis of the PMSM, $\vec{u}_{s2}$ and $\vec{u}_{s5}$ may be applied. For C-axis of the PMSM, $\vec{u}_{s3}$ and $\vec{u}_{s6}$ may be applied.

The process of applying the voltage space vectors to the A-axis phase winding is taken as example for illustration.

Figure 8:
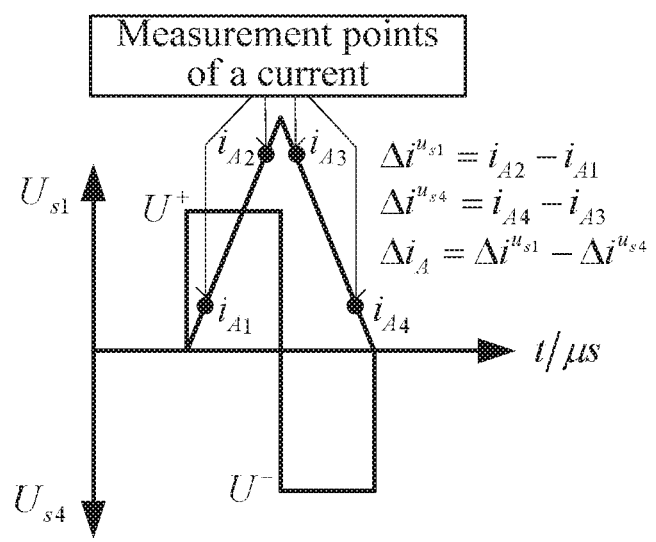
FIG. 8 is a schematic diagram of measurement points of a current according to an embodiment of the present disclosure.

FIG. 8 is a schematic diagram of measurement points of a current according to the present disclosure.

The measurement points illustrated in FIG. 8 are $i_{A1}$, $i_{A2}$, $i_{A3}$ and $i_{A4}$.

$$\Delta i_A^{u_{s1}} = i_{A2} - i_{A1} \tag{12}$$

$$\Delta i_A^{u_{s4}} = i_{A4} - i_{A3} \tag{13}$$

$$\frac{\Delta i_A^{(u_{s1})}}{\Delta t} - \frac{\Delta i_A^{(u_{s4})}}{\Delta t} = [L_s(\theta_r)]^{-1}(\vec{u}_{s1} - \vec{u}_{s4}) \tag{14}$$

Therefore, $\Delta i_A = \Delta i_A^{u_{s1}} - \Delta i_A^{(u_{s4})} = [L_s(\theta_r)]^{-1} 2|\vec{u}_s|\Delta t$ (15)

The equation (11) is substituted into the equation (15) to yield:

$$\Delta i_A = \frac{|\vec{u}_s|}{L_d L_q} [(L_d + L_q) - (L_d - L_q)\cos 2\theta_e]\Delta t \tag{16}$$

For the voltage space vectors applied to the B-axis phase winding, there is an equation similar to that of A-axis:

$$\Delta i_B = \frac{|\vec{u}_s|}{L_d L_q} [(L_d + L_q) - (L_d - L_q)\cos 2(\theta_e - 4\pi/3)]\Delta t \tag{17}$$

For the voltage space vectors applied to the C-axis winding, there is an equation similar to that of A-axis;

$$\Delta i_C = \frac{|\vec{u}_s|}{L_d L_q} [(L_d + L_q) - (L_d - L_q)\cos 2(\theta_e - 2\pi/3)]\Delta t \tag{18}$$

A deviation of the three phase current of the stator may be expressed in a form of a space vector $f(\Delta \vec{i}_s)$, which is $$f(\Delta i_s) = \sqrt{\frac{2}{3}} \left[ \Delta i_A + \Delta i_B e^{j\left(\frac{2\pi}{3}\right)} + \Delta i_C e^{j\left(\frac{4\pi}{3}\right)} \right]. \tag{19}$$

The equation (19) may be simplified to yield the following equation:

$$f(\Delta i_s) = \frac{1}{2}\sqrt{\frac{2}{3}} \frac{1}{L_d L_q} (L_d - L_q)|\vec{u}_s|\Delta t\, e_e^{j(2\theta_r + \pi)}. \tag{20}$$

The $f(\Delta i_s)$ may be calculated based on equation (19) by measuring the maximum amplitude of the three phase current of the stator of the PMSM, so that a spatial phase of the three phase current may be obtained. It can be known from the equation (20) that, the spatial phase is equal to $(2\theta_e + \pi)$, so that $\hat{\theta}_e$ may be estimated based on the equation (20):

$$\hat{\theta}_e = \frac{\arg(f) - \pi}{2}. \tag{21}$$

The process of obtaining the position of the rotor with the INFORM method when the PMSM rotates at a low speed according to the present disclosure is described hereinafter, which includes steps S601 to S606.

In step S601, the voltage space vectors $\vec{u}_{s1}$ and $\vec{u}_{s4}$ are alternately and successively applied for respective predetermined periods of time, to obtain an A-phase current of the permanent magnet synchronous motor.

The obtaining an A-phase current refers to obtaining $\Delta i_A^{u_{s1}}$ and $\Delta i_A^{u_{s4}}$ based on equation (12) and equation (13) and then obtaining $\Delta i_A$ based on equation (15).

It should be noted that the expression that the voltage space vectors $\vec{u}_{s1}$ and $\vec{u}_{s4}$ are alternately and successively applied refers to applying $\vec{u}_{s1}$ for a predetermined period of time and then immediately applying $\vec{u}_{s4}$ for a predetermined period of time.

It can be understood that the predetermined period of time may be set as needed. For example, the predetermined period of time may be set as 100 us in the embodiment.

In step S602, a drive pulse of the inverter is blocked for N milliseconds, where N is a predetermined integer.

It should be noted that, the blocking a drive pulse of the inverter for N milliseconds refers to applying no voltage space vector, so as to set the current of the PMSM to be zero.

The value of N may be selected as needed. For example, the value of N may be 1, that is, the drive pulse is blocked for 1 ms.

The process of applying the voltage space vectors to the B-axis or the C-axis is the same as that of the A-axis, which is not described in detail hereinafter.

In step S603, the voltage space vectors $\vec{u}_{s2}$ and $\vec{u}_{s5}$ are alternately and successively applied for respective predetermined periods of time, to obtain a B-phase current of the permanent magnet synchronous motor;

In step S604, the drive pulse of the inverter is blocked for N milliseconds.

In step S605, the voltage space vectors $\vec{u}_{s3}$ and $\vec{u}_{s6}$ are alternately and successively applied for respective predetermined periods of time, to obtain a C-phase current of the permanent magnet synchronous motor.

In step S606, the position of the rotor is calculated based on the equation (19) and the equation (21).

$\vec{u}_{s1}$, $\vec{u}_{s2}$, $\vec{u}_{s3}$, $\vec{u}_{s4}$, $\vec{u}_{s5}$ and $\vec{u}_{s6}$ are space vectors, phases of which sequentially have a difference of 60 degrees in an anti-clockwise direction.

Figure 7:
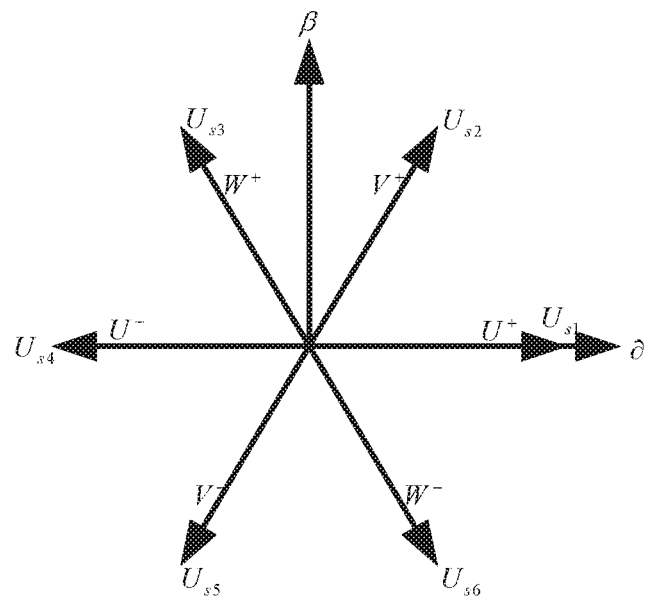
FIG. 7 is a schematic diagram of voltage space vectors according to an embodiment of the present disclosure.

The voltage space vectors may refer to FIG. 7.

First Device Embodiment

Based on the above method for controlling restarting of a permanent magnet synchronous motor in a rotating condition, a device for controlling restarting of a permanent magnet synchronous motor in a rotating condition is further provided according to the present disclosure, which is described in detail hereinafter in conjunction with the drawings.

Figure 9:
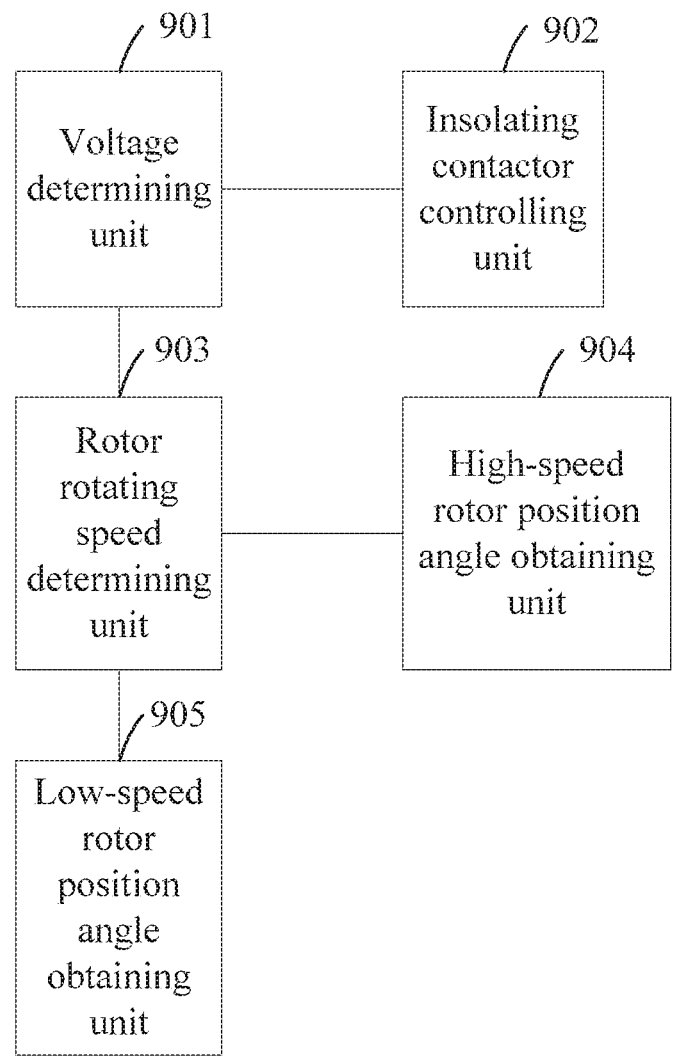
FIG. 9 is a schematic diagram of a device for controlling restarting of a permanent magnet synchronous motor in a rotating condition according to a first device embodiment of the present disclosure.

FIG. 9 is a schematic diagram of a device for controlling restarting of a permanent magnet synchronous motor in a rotating condition according to a first device embodiment of the present disclosure.

The device for controlling restarting of a permanent magnet synchronous motor in a rotating condition according to the embodiment of the present disclosure includes: a voltage determining unit 901, an insolating contactor controlling unit 902, a rotor rotating speed determining unit 903, a high-speed rotor position angle obtaining unit 904 and a low-speed rotor position angle obtaining unit 905.

The voltage determining unit 901 is configured to determine whether a back electromotive force of a permanent magnet synchronous motor is higher than a voltage at a side of an inverter.

It should be noted that, the back electromotive force of the PMSM may be obtained based on equation (1), where $\omega_e$ may be obtained based on a speed of a trailer.

For convenience of determination, a voltage at a direct-current side of the inverter may be taken as a criterion for the voltage at the side of the inverter. For example, the voltage at the side of the inverter may be $U_{dc}/\sqrt{3}$.

The isolating contactor controlling unit 902 is configured to control an isolating contactor to be switched off and forbid the restarting in a case that the voltage determining unit 901 determines that the electromotive force of the permanent magnet synchronous motor is higher than the voltage at the side of the inverter.

The isolating contactor controlling unit 902 is to ensure safety of a capacitor at the direct-current side of the inverter.

The rotor rotating speed determining unit 903 is configured to determine whether a rotating speed of a rotor of the permanent magnet synchronous motor is higher than a predetermined rotating speed in a case that the voltage determining unit 901 determines that the electromotive force of the permanent magnet synchronous motor is lower than or equal to the voltage at the side of the inverter.

If the electromotive force of the permanent magnet synchronous motor is lower than or equal to the voltage at the side of the inverter, then the isolating contactor is allowed to be switched on, and the PMSM can be started only when a position angle of the rotor is further acquired. Therefore, it is required that $\omega_e$ is obtained based on the speed of the trailer in the following step, and there are two ways for acquiring the position angle of the rotor according to the magnitude of $\omega_e$. The first way is to acquire the position angle of the rotor in a low-speed operating condition, and the second way is to acquire the position angle of the rotor in a high-speed operating condition.

The high-speed rotor position angle obtaining unit 904 is configured to control the permanent magnet synchronous motor to be in a short circuit state, obtain a current angle in a α–β stationary coordinate system based on a maximum amplitude of a three phase current of the permanent magnet synchronous motor in the short circuit state, calculate a current angle in a dq coordinate system based on a duration of the short circuit state of permanent magnet synchronous motor, and calculate a position angle of the rotor by subtracting the current angle in the α–β stationary coordinate system from the current angle in the dq coordinate system, and start the permanent magnet synchronous motor at the position angle of the rotor, if the rotor rotating speed determining unit 903 determines that the rotating speed of the rotor of the permanent magnet synchronous motor is higher than the predetermined rotating speed.

The low-speed rotor position angle obtaining unit 905 is configured to apply voltage space vectors with different directions to the permanent magnet synchronous motor, measure the three phase current of the permanent magnet synchronous motor, obtain the position angle of the rotor based on the three phase current of the permanent magnet synchronous motor, and start the permanent magnet synchronous motor based on the position angle of the rotor, in a case that the rotor rotating speed determining unit 903 determines that the rotating speed of the rotor of the permanent magnet synchronous motor is lower than or equal to the predetermined rotating speed.

The method for obtaining the position angle of the rotor at the low speed is mainly based on an indirect flux detection by on-line reactance measurement (INFORM) method.

In the method according to the present disclosure, from a systemic perspective, the electrical angular speed $\omega_e$ of the PMSM is obtained based on the speed of the trailer so as to obtain the back electromotive force of the PMSM. The back electromotive force is compared with the voltage at the side of the inverter, and if the electromotive force of the permanent magnet synchronous motor is higher than the voltage at the side of the inverter, the restarting of the PMSM in the rotating condition is forbidden, otherwise, the restarting of the PMSM in the rotating condition is allowed. The restarting of the PMSM in the rotating condition refers to switching on the isolating contactor, and the forbidding the restarting of the PMSM in the rotating condition refers to switching off the isolating contactor. The acquisition of the position angle of the rotor is required by the restarting of the PMSM in the rotating condition. Therefore, in the present disclosure, the low-speed operating condition and the high-speed operating condition for calculating the position angle of the rotor are determined according to the magnitude of $\omega_e$. The two operating conditions correspond to different position angles of the rotor, and the PMSM is started based on the position angle of the rotor. Based on the method according to the present disclosure, an overall control method is proposed from a systemic perspective, the restarting of the PMSM in the rotating condition is forbidden when the PMSM rotates at a high speed (the back electromotive force corresponding to the high speed is too high), a restarting position is determined by calculating the position angle of the rotor with the primary short-circuit method when the PMSM rotates at the high speed, and the restarting position is determined by calculating the position angle of the rotor with the INFORM method when the PMSM rotates at the low speed.

Second Device Embodiment

Figure 10:
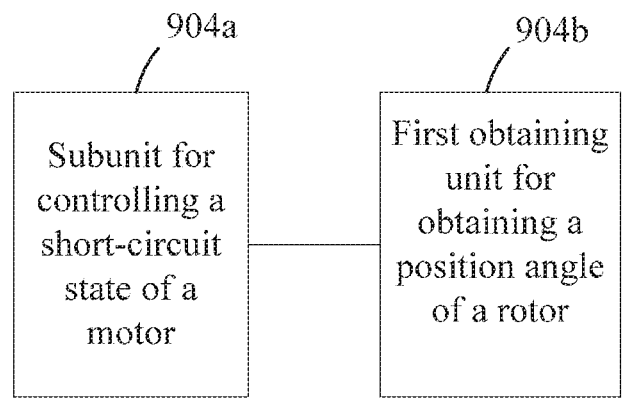
FIG. 10 is a schematic diagram of a device for controlling restarting of a permanent magnet synchronous motor in a rotating condition according to a second device embodiment of the present disclosure.

FIG. 10 is a device for controlling restarting of a permanent magnet synchronous motor in a rotating condition a schematic diagram according to a second device embodiment of the present disclosure.

In the device according to the embodiment, the high-speed rotor position angle obtaining unit includes: a subunit 904a for controlling a short circuit state of a motor and a first obtaining unit 904b for obtaining a position angle of a rotor.

The subunit 904a for controlling a short circuit state of a motor is configured to apply zero voltage vectors, to put the permanent magnet synchronous motor into the short circuit state.

It should be noted that there are two zero voltage vectors, which are $\vec{u}_{s0}$ and $\vec{u}_{s7}$. That is, the two different zero voltage vectors may be applied, to control all switching devices in an upper bridge arm of the inverter to be switched on or all switching devices in a lower bridge arm of the inverter to be switched on. When all the switching devices in the upper bridge arm are switched on, the permanent magnet synchronous motor may be in the short-circuit state; and when all the switching devices in the lower bridge arm are switched on, the permanent magnet synchronous motor may also be in the short circuit state. It is not limited in the embodiments of the present disclosure that whether all the switching devices in the upper bridge arm or all the switching devices in the lower bridge arm are switched on A subunit for obtaining a current angle of a short-circuit current of a motor in the α–β stationary coordinate system is configured to:

obtain a current angle of a current in the α–β stationary coordinate system based on the following equation;

calculate the current in the dq coordinate system based on the duration of the short circuit state of permanent magnet synchronous motor:

$$\begin{bmatrix} i_d \\ i_q \end{bmatrix} = \begin{bmatrix} -\frac{\phi_f}{L_d}(1-\cos(\omega T_{sh})) \\ \frac{\phi_f}{L_q}\sin(\omega T_{sh}) \end{bmatrix}$$

where $T_{sh}$ is the duration of the short circuit state of permanent magnet synchronous motor, $L_d$ and $L_q$ are a direct-axis synchronous inductance and a quadrature-axis synchronous inductance respectively, $\phi_f$ is a flux linkage of a permanent magnet, and $i_d$ and $i_q$ are components of the current of a stator along the direct axis and the quadrature axis respectively which are called a direct-axis current and a quadrature-axis current respectively; and resolve a maximum amplitude of a three phase current into $i_\alpha$ and $i_\beta$ in the α–β stationary coordinate system, and define $\theta_{I_{\alpha\beta}}$ as the current angle of the $i_{T_{sh}}$ in the α–β stationary coordinate system:

$$\theta_{I_{\alpha\beta}} = \tan^{-1}\left(\frac{i_\alpha}{i_\beta}\right)$$

A subunit for obtaining a current angle of a short-circuit current of a motor in the dq coordinate system, configured to obtain the current angle of the current of the motor in the dq coordinate system based on the following equation:

$$\theta_{I_{dq}} \cong \tan^{-1}\left(\frac{i_q}{i_d}\right) = \tan^{-1}\left(\frac{-\frac{\varphi_f}{L_q}\sin(\omega_e T_{sh})}{-\frac{\varphi_f}{L_d}(1-\cos(\omega_e T_{sh}))}\right)$$

The first obtaining unit 904b for obtaining a position angle of a rotor, configured to calculate the position angle of the rotor based on the following equation $\theta_e = \theta_{I_{dp}} - \theta_{I_{\alpha\beta}}$.

In the embodiment, the position angle of the rotor when the PMSM rotates at the high speed is calculated by using the primary short-circuit method, and the specific operating principle and the calculation equations may refer to the second method embodiment, and are not described in detail herein.

Third Device Embodiment

Figure 11:
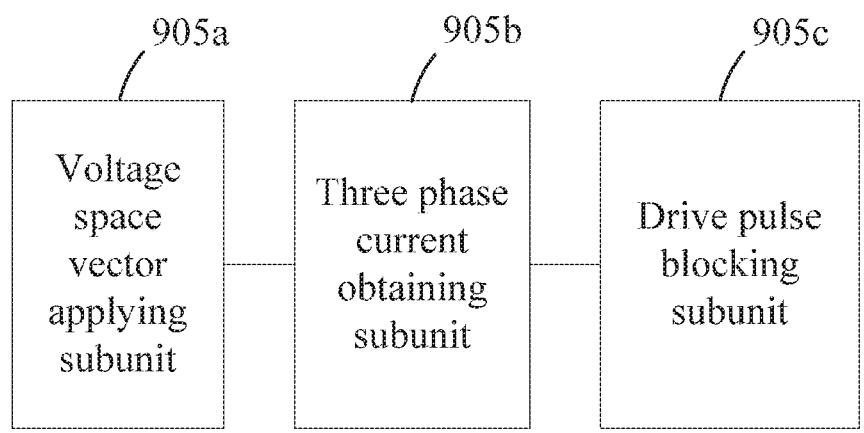
FIG. 11 is a schematic diagram of a device for controlling restarting of a permanent magnet synchronous motor in a rotating condition according to a third device embodiment of the present disclosure.

FIG. 11 a schematic diagram of a device for controlling restarting of a permanent magnet synchronous motor in a rotating condition according to a third device embodiment of the present disclosure.

In the device according to the embodiment, the low-speed rotor position angle obtaining unit includes: a voltage space vector applying subunit 905a, a three phase current obtaining subunit 905b and a drive pulse blocking subunit 905c, where the voltage space vector applying subunit 905a is configured to alternately and successively apply voltage space vectors $\vec{u}_{s1}$ and $\vec{u}_{s4}$ for respective predetermined periods of time; the three phase current obtaining subunit 905b is configured to obtain a A-phase current of the permanent magnet synchronous motor; and the drive pulse blocking subunit 905c is configured to block a drive pulse of the inverter for N milliseconds, where N is a predetermined integer;

the voltage space vector applying subunit 905a is configured to alternately and successively apply voltage space vectors $\vec{u}_{s2}$ and $\vec{u}_{s5}$ for respective predetermined periods of time, to obtain a B-phase current of the permanent magnet synchronous motor; and the drive pulse blocking subunit 905c is configured to block the drive pulse of the inverter for N milliseconds, where N is a predetermined integer;

the voltage space vector applying subunit 905a is configured to alternately and successively apply voltage space vectors $\vec{u}_{s3}$ and $\vec{u}_{s6}$ for respective predetermined periods of time, to obtain a C-phase current of the permanent magnet synchronous motor; and $\vec{u}_{s1}$, $\vec{u}_{s2}$, $\vec{u}_{s3}$, $\vec{u}_{s4}$, $\vec{u}_{s5}$ and $\vec{u}_{s6}$ are space vectors, phases of which sequentially have a difference of 60 degrees in an anti-clockwise direction.

It should be noted that the specific operating principle, the INFORM method and the calculation equations in the third device embodiment may refer to the third method embodiment, and are not described in detail herein.

Based on the method and the device for restarting of a permanent magnet synchronous motor in a rotating condition according to the above embodiments, a system for controlling restarting of a permanent magnet synchronous motor in a rotating condition is further provided according to the present disclosure.

Figure 12:
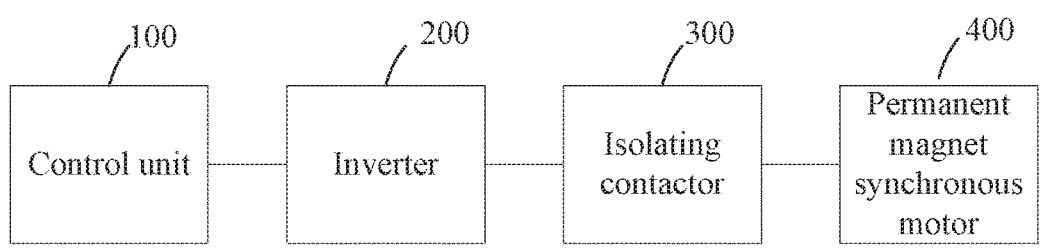
FIG. 12 is schematic diagram of a system for controlling restarting of a permanent magnet synchronous motor in a rotating condition according to a first system embodiment of the present disclosure.

FIG. 12 is a schematic diagram of a system for controlling restarting of a permanent magnet synchronous motor in a rotating condition according to a first system embodiment of the present disclosure.

The system for controlling restarting of a permanent magnet synchronous motor in a rotating condition according to the embodiment includes: a control unit 100, a permanent magnet synchronous motor 400, an inverter 200 and an isolating contactor 300, where the control unit is configured to control the isolating contractor 300 to be switched on or off; the inverter 200 and the permanent magnet synchronous motor 400 are connected to the isolating contactor 300;

the control unit 100 is further configured to output pulse signals to control switching devices of the inverter 200 to be switched on or off; and the control unit 100 is further configured to:

determine whether a back electromotive force of the permanent magnet synchronous motor 400 is higher than a voltage at a side of the inverter 200;

control an isolating contactor 300 to be switched off and forbidding a restarting of the PMSM in a rotating condition, if the electromotive force of the permanent magnet synchronous motor 400 is higher than the voltage at the side of the inverter 200;

proceed to determine whether a rotating speed of a rotor of the permanent magnet synchronous motor 400 is higher than a predetermined rotating speed, if the electromotive force of the permanent magnet synchronous motor 400 is lower than or equal to the voltage at the side of the inverter 200;

control the permanent magnet synchronous motor 400 to be in a short circuit state, obtain, an current angle in a α-β stationary coordinate system, based on a maximum amplitude of a three phase current of the permanent magnet synchronous motor 400 in the short circuit state, calculate a current angle in a dq coordinate system, based on a duration of the short circuit state of permanent magnet synchronous motor 400, and calculate a position angle of the rotor by subtracting the current angle in the α-β stationary coordinate system from the current angle in the dq coordinate system, and start the permanent magnet synchronous motor 400 based on the position angle of the rotor, if the rotating speed of the rotor of the permanent magnet synchronous motor is higher than the predetermined rotating speed; and apply voltage space vectors with different directions to the permanent magnet synchronous motor 400, measure the three phase current of the permanent magnet synchronous motor 400, obtain the position angle of the rotor based on the three phase current of the permanent magnet synchronous motor 400, and start the permanent magnet synchronous motor 400 based on the position angle of the rotor, if the rotating speed of the rotor of the permanent magnet synchronous motor 400 is lower than or equal to the predetermined rotating speed.

In the system according to the present disclosure, from a systemic perspective, the electrical angular speed $\omega_e$ of the PMSM is obtained based on the speed of the trailer so as to obtain the back electromotive force of the PMSM. The back electromotive force is compared with the voltage at the side of the inverter, and if the electromotive force of the permanent magnet synchronous motor is higher than the voltage at the side of the inverter, the restarting of the PMSM in the rotating condition is forbidden, otherwise, the restarting of the PMSM in the rotating condition is allowed. The restarting of the PMSM in the rotating condition refers to switching on the isolating contactor, and the forbidding the restarting of the PMSM in the rotating condition refers to switching off the isolating contactor. The acquisition of the position angle of the rotor is required by the restarting of the PMSM in the rotating condition. Therefore, in the present disclosure, the low-speed operating condition and the high-speed operating condition for calculating the position angle of the rotor are determined according to the magnitude of $\omega_e$. The two operating conditions correspond to different position angles of the rotor, and the PMSM is started based on the position angle of the rotor. Based on the method according to the present disclosure, an overall control method is proposed from a systemic perspective, the restarting of the PMSM in the rotating condition is forbidden when the PMSM rotates at a high speed (the back electromotive force corresponding to the high speed is too high), a restarting position is determined by calculating the position angle of the rotor with the primary short-circuit method when the PMSM rotates at the high speed, and the restarting position is determined by calculating the position angle of the rotor with the INFORM method when the PMSM rotates at the low speed.

The process of applying voltage space vectors with different directions to the permanent magnet synchronous motor and measuring the three phase current of the permanent magnet synchronous motor includes:

applying voltage space vectors $\vec{u}_{s1}$ and $\vec{u}_{s4}$ alternately and successively for respective predetermined periods of time, to obtain a A-phase current of the permanent magnet synchronous motor;

blocking a drive pulse of the inverter for N milliseconds, where the N is a predetermined integer;

applying voltage space vectors $\vec{u}_{s1}$ and $\vec{u}_{s5}$ alternately and successively for respective predetermined periods of time, to obtain a B-phase current of the permanent magnet synchronous motor;

blocking the drive pulse of the inverter for N milliseconds; and applying voltage space vectors $\vec{u}_{s3}$ and $\vec{u}_{s6}$ alternately and successively for respective predetermined periods of time, to obtain a C-phase current of the permanent magnet synchronous motor, where $\vec{u}_{s1}$, $\vec{u}_{s2}$, $\vec{u}_{s3}$, $\vec{u}_{s4}$, $\vec{u}_{s5}$ and $\vec{u}_{s6}$ are space vectors phases of which sequentially have a difference of 60 degrees in an anti-clockwise direction.

It should be noted that the specific operating principle, the INFORM method and the calculation equations for calculating the position angle of the rotor of the PMSM in a rotating condition in the system embodiment may refer to the third method embodiment, and are not described in detail herein.

The above are only preferred embodiments of the present disclosure, and should not be interpreted as limiting of the form of the present disclosure in any way. Although the present disclosure is disclosed by the above preferred embodiments, the preferred embodiments are not used to limit the present disclosure. Various changes and modifications to the technical solutions of the present disclosure can be made by those skilled in the art according to the above method and technical contents within the principle and scope of the present disclosure. Alternatively, the technical solutions of the present disclosure can be modified into equivalent embodiments. Therefore, any simple changes, equivalents and modifications which do not depart from the technical solutions of the present disclosure are also deemed to fall within the scope of protection of the technical solutions of the present disclosure. The foregoing embodiments are only preferred embodiments of the disclosure and are not meant to limit the disclosure. The preferred embodiments according to the disclosure are disclosed above, and are not intended to limit the disclosure. Those of skills in the art may make, based on the disclosed method and technical content, some variations and improvements on the technical solutions of the disclosure, or make some equivalent variations on the embodiments without departing from the scope of the technical solutions. All simple modifications, equivalent variations and improvements made based on the technical essence of the disclosure without departing from content of the technical solutions of the disclosure fall in the scope of the technical solutions of the disclosure.

The invention claimed is:

1. A method for controlling restarting of a permanent magnet synchronous motor in a rotating condition, comprising:
    determining whether a back electromotive force of a permanent magnet synchronous motor is higher than a voltage at a side of an inverter;
    controlling an isolating contactor to be switched off and forbidding a restarting of the permanent magnet synchronous motor in a rotating condition, if the electromotive force of the permanent magnet synchronous motor is higher than the voltage at the side of the inverter;
    proceeding to determine whether a rotating speed of a rotor of the permanent magnet synchronous motor is higher than a predetermined rotating speed, if the back electromotive force of the permanent magnet synchronous motor is lower than or equal to the voltage at the side of the inverter;
    controlling the permanent magnet synchronous motor to be in a short circuit state, obtaining a current angle in a α-β stationary coordinate system based on a maximum amplitude of a three phase current of the permanent magnet synchronous motor in the short circuit state, calculating a current angle in a dq coordinate system based on a duration of the short circuit state of permanent magnet synchronous motor, and calculating a position angle of the rotor by subtracting the current angle in the α-β stationary coordinate system from the current angle in the dq coordinate system, and starting the permanent magnet synchronous motor based on the position angle of the rotor, if the rotating speed of the rotor of the permanent magnet synchronous motor is higher than the predetermined rotating speed; and
    applying voltage space vectors with different directions to the permanent magnet synchronous motor, measuring the three phase current of the permanent magnet synchronous motor, obtaining the position angle of the rotor based on the three phase current of the permanent magnet synchronous motor, and starting the permanent magnet synchronous motor based on the position angle of the rotor, if the rotating speed of the rotor of the permanent magnet synchronous motor is lower than or equal to the predetermined rotating speed, wherein the process of applying voltage space vectors with different directions to the permanent magnet synchronous motor and measuring the three phase current of the permanent magnet synchronous motor comprises:
    applying voltage space vectors $\vec{u}_{s1}$ and $\vec{u}_{s4}$ alternately and successively for respective predetermined periods of time, to obtain a A-phase current of the permanent magnet synchronous motor;
    blocking a drive pulse of the inverter for N milliseconds, wherein N is a predetermined integer;
    applying voltage space vectors $\vec{u}_{s2}$ and $\vec{u}_{s5}$ alternately and successively for respective predetermined periods of time, to obtain a B-phase current of the permanent magnet synchronous motor;
    blocking the drive pulse of the inverter for N milliseconds; and
    applying voltage space vectors $\vec{u}_{s3}$ and $\vec{u}_{s6}$ alternately and successively for respective predetermined periods of time, to obtain a C-phase current of the permanent magnet synchronous motor,
    wherein $\vec{u}_{s1}$, $\vec{u}_{s2}$, $\vec{u}_{s3}$, $\vec{u}_{s4}$, $\vec{u}_{s5}$ and $\vec{u}_{s6}$ are space vectors, phases of which sequentially have a difference of 60 degrees in an anti-clockwise direction.

2. The method for controlling restarting of a permanent magnet synchronous motor in a rotating condition according to claim 1, wherein the process of controlling the permanent magnet synchronous motor to be in a short circuit state, obtaining, a current angle in a α-β stationary coordinate system, based on a maximum amplitude of a three phase current of the permanent magnet synchronous motor in the short circuit state, calculating a current angle in a dq coordinate system, based on a duration of the short circuit state of the permanent magnet synchronous motor, and calculating a position angle of the rotor by subtracting the current angle in the α-β stationary coordinate system from the current angle in the dq coordinate system, if the rotating speed of the rotor of the permanent magnet synchronous motor is higher than the predetermined rotating speed comprises:
    applying zero voltage vectors, to put the permanent magnet synchronous motor into the short circuit state;
    calculating a current in the dq coordinate system based on the duration of the short circuit state of permanent magnet synchronous motor:

$$\begin{bmatrix} i_d \\ i_q \end{bmatrix} = \begin{bmatrix} -\dfrac{\phi_f}{L_d}(1 - \cos(\omega T_{sh})) \\ \dfrac{\phi_f}{L_q}\sin(\omega T_{sh}) \end{bmatrix}$$

wherein $T_{sh}$ is the duration of the short circuit state of permanent magnet synchronous motor, $L_d$ and $L_q$ are a direct-axis synchronous inductance and a quadrature-axis synchronous inductance respectively, $\phi_f$ is a flux linkage of a permanent magnet, and $i_d$ and $i_q$ are components of the current of a stator along the direct-axis and the quadrature-axis respectively which are called a direct-axis current and a quadrature-axis current respectively;
resolving a maximum amplitude of the three phase current into $i_\alpha$ and $i_\beta$ in the α-β stationary coordinate system, and defining $\theta_{I_{\alpha\beta}}$ as the current angle of $i_{T_{sh}}$ in the α-β stationary coordinate system:

$$\theta_{I_{\alpha\beta}} = \tan^{-1}\left(\dfrac{i_\alpha}{i_\beta}\right);$$

calculating the current angle $\theta_{I_{dq}}$ of the maximum amplitude of the three phase current in the dq coordinate system based on the following equation:

$$\theta_{I_{dq}} \cong \tan^{-1}\left(\frac{i_q}{i_d}\right) = \tan^{-1}\left(\frac{-\frac{\varphi_f}{L_q}\sin(\omega_e T_{sh})}{-\frac{\varphi_f}{L_d}(1-\cos(\omega_e T_{sh}))}\right)$$

and calculating the position angle of the rotor based on the following equation:

$$\theta_e = \theta_{I_{dp}} - \theta_{I_{\alpha\beta}}.$$

3. The method for controlling restarting of a permanent magnet synchronous motor in a rotating condition according to claim 1, wherein the process of obtaining the position angle of the rotor based on the three phase current of the permanent magnet synchronous motor comprises:
obtaining the position angle of the rotor based on the following equation:

$$\hat{\theta}_e = \frac{\arg(f) - \pi}{2}$$

wherein f is a deviation of the three phase current in a form of a space vector:

$$f(\Delta i_s) = \sqrt{\frac{2}{3}}\left[\Delta i_A + \Delta i_B e^{j\left(\frac{2\pi}{3}\right)} + \Delta i_C e^{j\left(\frac{4\pi}{3}\right)}\right] \text{ and}$$

$$\Delta i_A = \frac{|\vec{u}_s|}{L_d L_q}[(L_d + L_q) - (L_d - L_q)\cos 2\theta_e]\Delta t,$$

$$\Delta i_B = \frac{|\vec{u}_s|}{L_d L_q}[(L_d + L_q) - (L_d - L_q)\cos 2(\theta_e - 4\pi/3)]\Delta t \text{ and}$$

$$\Delta i_C = \frac{|\vec{u}_s|}{L_d L_q}[(L_d + L_q) - (L_d - L_q)\cos 2(\theta_e - 2\pi/3)]\Delta t.$$

4. The method for controlling restarting of a permanent magnet synchronous motor in a rotating condition according to claim 1, wherein the back electromotive force of the permanent magnet synchronous motor is calculated based on the following equation:

$$E_0 = \omega_e \psi_f$$

wherein $E_0$ is the back electromotive force of the permanent magnet synchronous motor, $\omega_e$ is the electrical angular speed of the rotor of the permanent magnet synchronous motor, and $\psi_f$ is the flux linkage of the permanent magnet.

5. A device for controlling restarting of a permanent magnet synchronous motor in a rotating condition, comprising: a voltage determining unit, an insolating contactor controlling unit, a rotor rotating speed determining unit, a high-speed rotor position angle obtaining unit and a low-speed rotor position angle obtaining unit, wherein
the voltage determining unit is configured to determine whether a back electromotive force of a permanent magnet synchronous motor is higher than a voltage at a side of an inverter;
the isolating contactor controlling unit is configured to control an isolating contactor to be switched off and forbid a restarting of the permanent magnet synchronous motor in a rotating condition in a case that the voltage determining unit determines that the back electromotive force of the permanent magnet synchronous motor is higher than the voltage at the side of the inverter;
the rotor rotating speed determining unit is configured to determine whether a rotating speed of a rotor of the permanent magnet synchronous motor is higher than a predetermined rotating speed in a case that the voltage determining unit determines that the electromotive force of the permanent magnet synchronous motor is lower than or equal to the voltage at the side of the inverter;
the high-speed rotor position angle obtaining unit is configured to control the permanent magnet synchronous motor to be in a short circuit state, obtain a current angle in a $\alpha-\beta$ stationary coordinate system based on a maximum amplitude of a three phase current of the permanent magnet synchronous motor in the short circuit state, calculate a current angle in a dq coordinate system based on a duration of the short circuit state of permanent magnet synchronous motor, and calculate a position angle of the rotor by subtracting the current angle in the $\alpha-\beta$ stationary coordinate system from the current angle in the dq coordinate system, and start the permanent magnet synchronous motor based on the position angle of the rotor in a case that the rotor rotating speed determining unit determines that the rotating speed of the rotor of the permanent magnet synchronous motor is higher than the predetermined rotating speed; and
the low-speed rotor position angle obtaining unit is configured to apply voltage space vectors with different directions to the permanent magnet synchronous motor, measure the three phase current of the permanent magnet synchronous motor, obtain the position angle of the rotor based on the three phase current of the permanent magnet synchronous motor, and start the permanent magnet synchronous motor based on the position angle of the rotor, in a case that the rotor rotating speed determining unit determines that the rotating speed of the rotor of the permanent magnet synchronous motor is lower than or equal to the predetermined rotating speed, wherein the low-speed rotor position angle obtaining unit comprises a voltage space vector applying subunit, a three phase current obtaining subunit and a drive pulse blocking subunit, wherein
the voltage space vector applying subunit is configured to alternately and successively apply voltage space vectors $\vec{u}_{s1}$ and $\vec{u}_{s4}$ for respective predetermined periods of time; the three phase current obtaining subunit is configured to obtain a A-phase current of the permanent magnet synchronous motor; and the drive pulse blocking subunit is configured to block a drive pulse of the inverter for N milliseconds, wherein N is a predetermined integer;
the voltage space vector applying subunit is configured to alternately and successively apply voltage space vectors $\vec{u}_{s2}$ and $\vec{u}_{s5}$ for respective predetermined periods of time, to obtain a B-phase current of the permanent magnet synchronous motor; and the drive pulse blocking subunit is configured to block the drive pulse of the inverter for N milliseconds, wherein N is a predetermined integer;

the voltage space vector applying subunit is configured to alternately and successively apply voltage space vectors $\vec{u}_{s3}$ and $\vec{u}_{s6}$ for respective predetermined periods of time, to obtain a C-phase current of the permanent magnet synchronous motor; and $\vec{u}_{s1}$, $\vec{u}_{s2}$, $\vec{u}_{s3}$, $\vec{u}_{s4}$, $\vec{u}_{s5}$ and $\vec{u}_{s6}$ are space vectors, phases of which sequentially have a difference of 60 degrees in an anti-clockwise direction.

6. The device for controlling restarting of a permanent magnet synchronous motor in a rotating condition according to claim 5, wherein the high-speed rotor position angle obtaining unit comprises:
  a subunit for controlling a short circuit state of a motor, configured to apply zero voltage vectors, to put the permanent magnet synchronous motor into the short circuit state;
  a subunit for obtaining a current angle of a short-circuit current of a motor in the α-β stationary coordinate system, configured to:
  obtain a current angle of a current in the α-β stationary coordinate system based on the following equation;
  calculate the current in the dq coordinate system based on the duration of the short circuit state of permanent magnet synchronous motor:

$$\begin{bmatrix} i_d \\ i_q \end{bmatrix} = \begin{bmatrix} -\frac{\phi_f}{L_d}(1-\cos(\omega T_{sh})) \\ \frac{\phi_f}{L_q}\sin(\omega T_{sh}) \end{bmatrix}$$

wherein $T_{sh}$ is the duration of the short circuit state of permanent magnet synchronous motor, $L_d$ and $L_q$ are a direct-axis synchronous inductance and a quadrature-axis synchronous inductance respectively, $\phi_f$ is a flux linkage of a permanent magnet, and $i_d$ and $i_q$ are components of the current of a stator along the direct axis and the quadrature axis respectively which are called a direct-axis current and a quadrature-axis current respectively; and
  resolve a maximum amplitude of the three phase current into $i_\alpha$ and $i_\beta$ in the α-β stationary coordinate system, and define $\theta_{I_{\alpha\beta}}$ as the current angle of the $i_{T_{sh}}$ in the α-β stationary coordinate system:

$$\theta_{I_{\alpha\beta}} = \tan^{-1}\left(\frac{i_\alpha}{i_\beta}\right)$$

a subunit for obtaining a current angle of a short-circuit current of a motor in the dq coordinate system, configured to obtain the current angle of the current of the motor in the dq coordinate system based on the following equation:

$$\theta_{I_{dq}} \cong \tan^{-1}\left(\frac{i_q}{i_d}\right) = \tan^{-1}\left(\frac{-\frac{\varphi_f}{L_q}\sin(\omega_e T_{sh})}{-\frac{\varphi_f}{L_d}(1-\cos(\omega_e T_{sh}))}\right)$$

and a first obtaining unit for obtaining a position angle of a rotor, configured to calculate the position angle of the rotor based on the following equation $\theta_e = \theta_{I_{dq}} - \theta_{I_{\alpha\beta}}$.

7. A control system for controlling restarting of a permanent magnet synchronous motor in a rotating condition, comprising a control unit, a permanent magnet synchronous motor, an inverter and an isolating contactor, wherein
  the control unit is configured to control the isolating contactor to be switched on or off; the inverter and the permanent magnet synchronous motor are connected to the isolating contactor;
  the control unit is further configured to output pulse signals to control switching devices of the inverter to be switched on or off; and
  the control unit is further configured to:
  determine whether a back electromotive force of the permanent magnet synchronous motor is higher than a voltage at a side of the inverter;
  control an isolating contactor to be switched off and forbidding a restarting of the permanent magnet synchronous motor in a rotating condition, if the electromotive force of the permanent magnet synchronous motor is higher than the voltage at the side of the inverter;
  proceed to determine whether a rotating speed of a rotor of the permanent magnet synchronous motor is higher than a predetermined rotating speed, if the electromotive force of the permanent magnet synchronous motor is lower than or equal to the voltage at the side of the inverter;
  control the permanent magnet synchronous motor to be in a short circuit state, obtain, an current angle in a α-β stationary coordinate system, based on a maximum amplitude of a three phase current of the permanent magnet synchronous motor in the short circuit state, calculate a current angle in a dq coordinate system, based on a duration of the short circuit state of permanent magnet synchronous motor, and calculate a position angle of the rotor by subtracting the current angle in the α-β stationary coordinate system from the current angle in the dq coordinate system, and start the permanent magnet synchronous motor based on the position angle of the rotor, if the rotating speed of the rotor of the permanent magnet synchronous motor is higher than the predetermined rotating speed; and
  apply voltage space vectors with different directions to the permanent magnet synchronous motor, measure the three phase currents of the permanent magnet synchronous motor, obtain the position angle of the rotor based on the three phase currents of the permanent magnet synchronous motor, and start the permanent magnet synchronous motor based on the position angle of the rotor, if the rotating speed of the rotor of the permanent magnet synchronous motor is lower than or equal to the predetermined rotating speed, wherein the process of applying voltage space vectors with different directions to the permanent magnet synchronous motor and measuring the three phase current of the permanent magnet synchronous motor comprises:
  applying voltage space vectors $\vec{u}_{s1}$ and $\vec{u}_{s4}$ alternately and successively for respective predetermined periods of time, to obtain a A-phase current of the permanent magnet synchronous motor;
  blocking a drive pulse of the inverter for N milliseconds, wherein N is a predetermined integer;
  applying voltage space vectors $\vec{u}_{s2}$ and $\vec{u}_{s5}$ alternately and successively for respective predetermined periods of time, to obtain a B-phase current of the permanent magnet synchronous motor;

blocking the drive pulse of the inverter for N milliseconds; and applying voltage space vectors $\vec{u}_{s3}$ and $\vec{u}_{s6}$ alternately and successively for respective predetermined periods of time, to obtain a C-phase current of the permanent magnet synchronous motor, wherein $\vec{u}_{s1}$, $\vec{u}_{s2}$, $\vec{u}_{s3}$, $\vec{u}_{s4}$, $\vec{u}_{s5}$ and $\vec{u}_{s6}$ are space vectors phases of which sequentially have a difference of 60 degrees in an anti-clockwise direction.

* * * * *